United States Patent [19]

Hiraishi et al.

[11] Patent Number: 5,428,850
[45] Date of Patent: Jul. 4, 1995

[54] SHOWER APPARATUS

[75] Inventors: Kazuo Hiraishi; Masaru Zaitsu; Masanori Sakuragi; Yasuharu Kato, all of Kitakyushu, Japan

[73] Assignee: Toto Ltd., Fukuoka, Japan

[21] Appl. No.: 281,651

[22] Filed: Jul. 28, 1994

Related U.S. Application Data

[63] Continuation of Ser. No. 101,103, Aug. 3, 1993, abandoned, which is a continuation of Ser. No. 668,152, Mar. 12, 1991, abandoned.

[30] Foreign Application Priority Data

| Mar. 12, 1990 | [JP] | Japan | 2-60290 |
| Mar. 27, 1990 | [JP] | Japan | 2-79999 |
| Mar. 31, 1990 | [JP] | Japan | 2-86049 |

[51] Int. Cl.⁶ .......................... A47K 3/22; E03C 1/00
[52] U.S. Cl. ........................... 4/601; 4/615; 4/668
[58] Field of Search .............. 4/546, 559, 567, 568, 4/570, 597, 605, 615, 668, 569, 601; 236/12 R; 126/362

[56] References Cited

U.S. PATENT DOCUMENTS

| 335,785 | 2/1886 | Taylor | 4/601 |
| 3,121,235 | 2/1964 | Gellmann | 4/570 |
| 3,827,088 | 8/1974 | Arnold et al. | 4/570 |
| 4,563,780 | 1/1986 | Pollack | 4/546 X |
| 4,606,325 | 8/1986 | Lujan, Jr. | 126/362 |
| 4,688,273 | 8/1987 | Lyng | 4/668 |
| 4,700,884 | 10/1987 | Barrett et al. | 4/668 X |
| 4,756,030 | 7/1988 | Juliver | 4/668 |
| 4,801,091 | 1/1989 | Sandvik | 4/567 X |
| 4,854,499 | 8/1989 | Neuman | 4/605 X |
| 4,964,181 | 10/1990 | Alpert | 4/597 |
| 5,121,511 | 6/1992 | Sakamoto et al. | 4/601 |

FOREIGN PATENT DOCUMENTS

| 0194625 | 9/1986 | European Pat. Off. |
| 0195271 | 9/1986 | European Pat. Off. |
| 0297544 | 1/1989 | European Pat. Off. |
| 0306235 | 3/1989 | European Pat. Off. |
| 0327041 | 8/1989 | European Pat. Off. | 4/597 |
| 0375259 | 6/1990 | European Pat. Off. |
| 3443780 | 6/1986 | Germany. |
| 3622139 | 1/1988 | Germany | 4/668 |
| 8811545 | 2/1989 | Germany. |
| 62-70880 | 5/1987 | Japan. |
| 63-15885 | 2/1988 | Japan | 4/601 |
| 63-69913 | 5/1988 | Japan. |
| 2-19291 | 2/1990 | Japan. |
| 0304127 | 12/1990 | Japan | 4/605 |
| 1024300 | 3/1966 | United Kingdom | 4/601 |
| 8704059 | 7/1987 | WIPO. |

OTHER PUBLICATIONS

European Search Report and Annex.
Translation of Japanese 62-70880, May 6, 1987.
Translation of Japanese 63-69913, May 11, 1988.
Translation of Japanese 2-19291, Feb. 8, 1990.

Primary Examiner—Robert M. Fetsuga
Attorney, Agent, or Firm—Sandler, Greenblum & Bernstein

[57] ABSTRACT

A shower apparatus is provided with a plurality of shower discharge ports. More specifically, a shower apparatus is provided, in which hot water remains in a hot water line, that is communicated with the shower discharge ports, after the discharge has been completed. The hot water, which has a lower temperature, is drained through a drain valve for disposal of the water in the hot water line and a drain line. At the beginning of the next shower discharge, cold water is thus prevented from being discharged. The operation of an opening and closing valve for effecting discharge and stoppage of each shower discharge port is controlled according to control programs, so that the shower discharge is automatically controlled. The content of the shower discharge, carried out according to the programs, can be changed by a user through the operation of a control section. Moreover, upon the start of the shower discharge, a sudden jet of water is prevented.

10 Claims, 24 Drawing Sheets

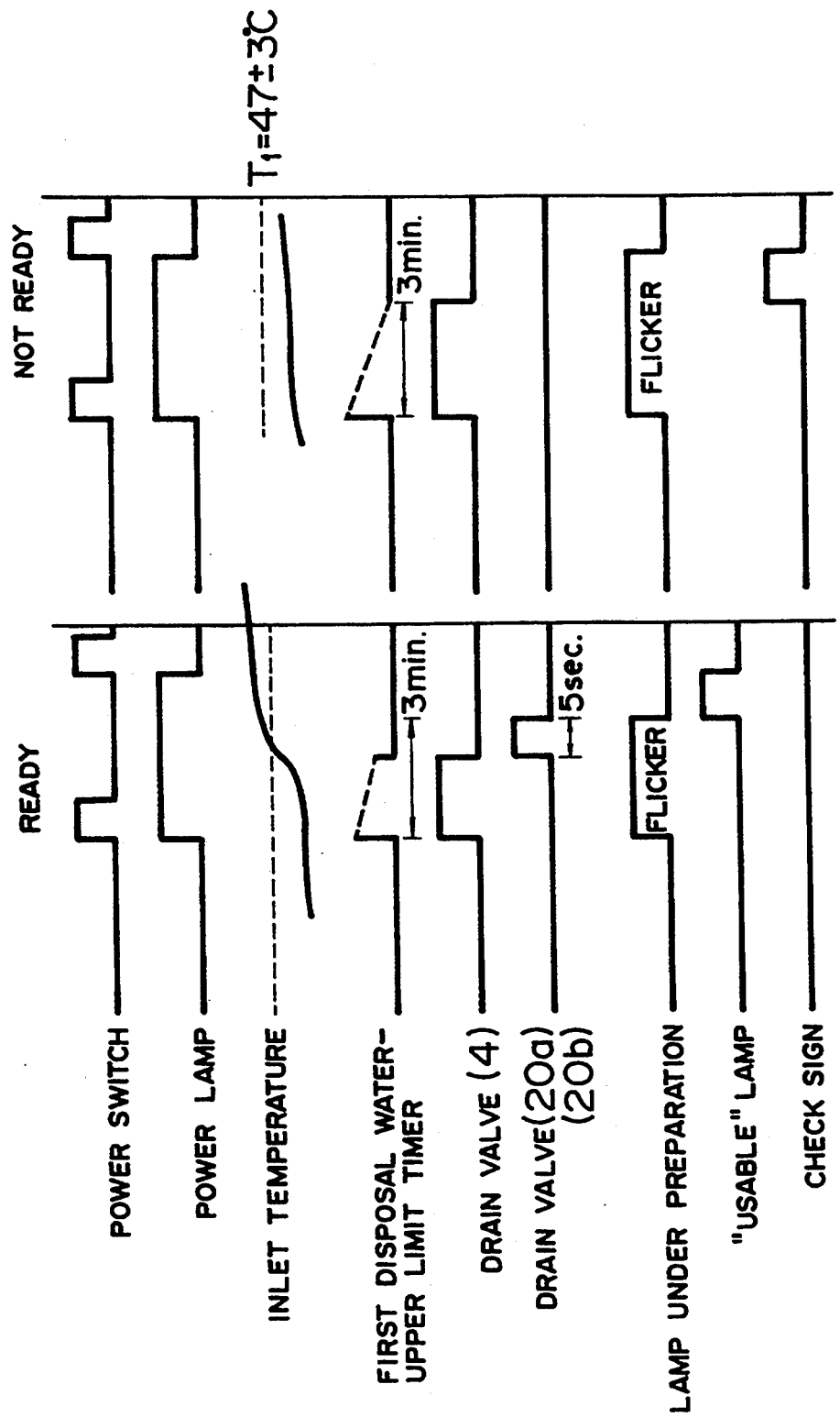

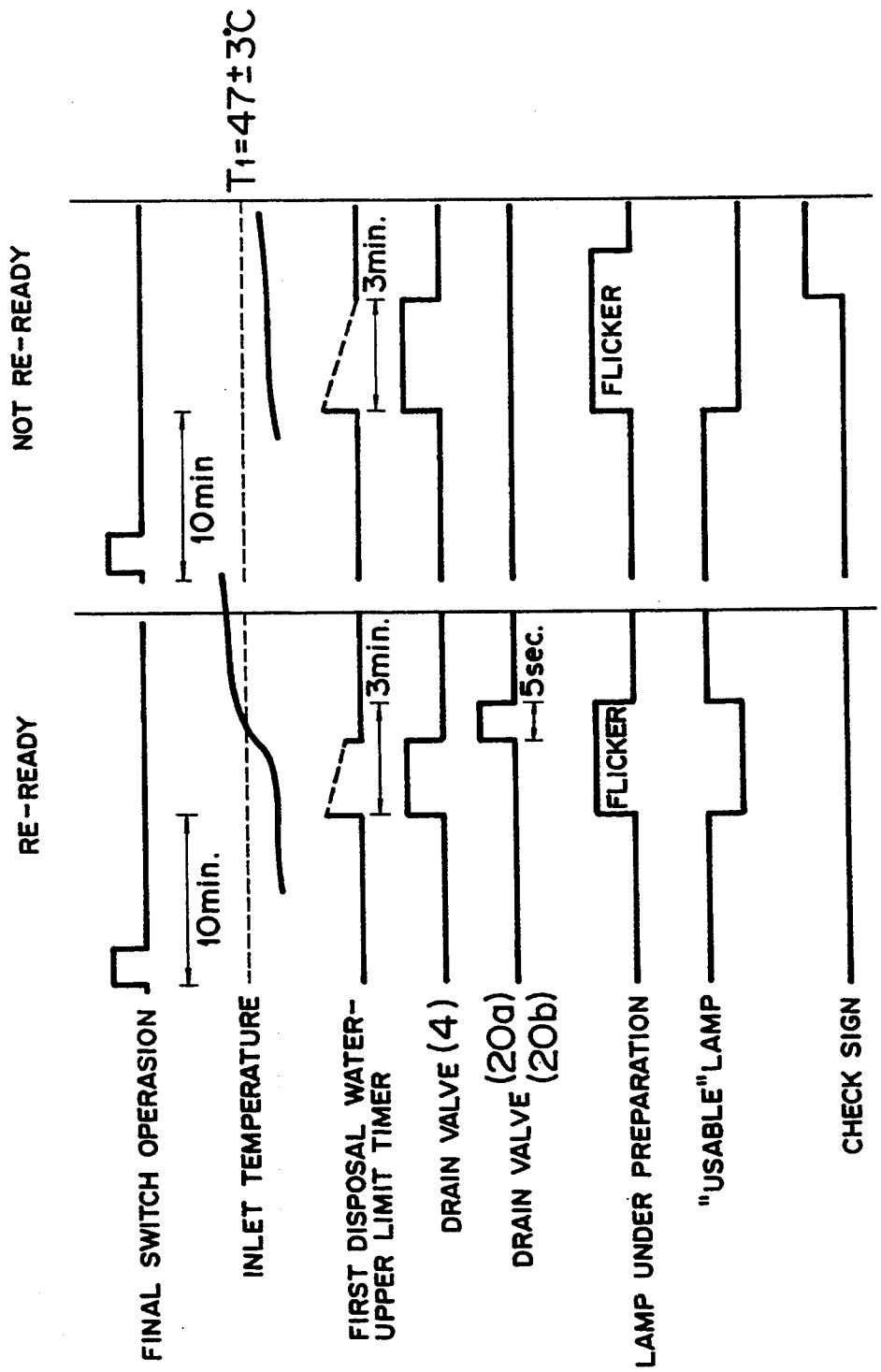

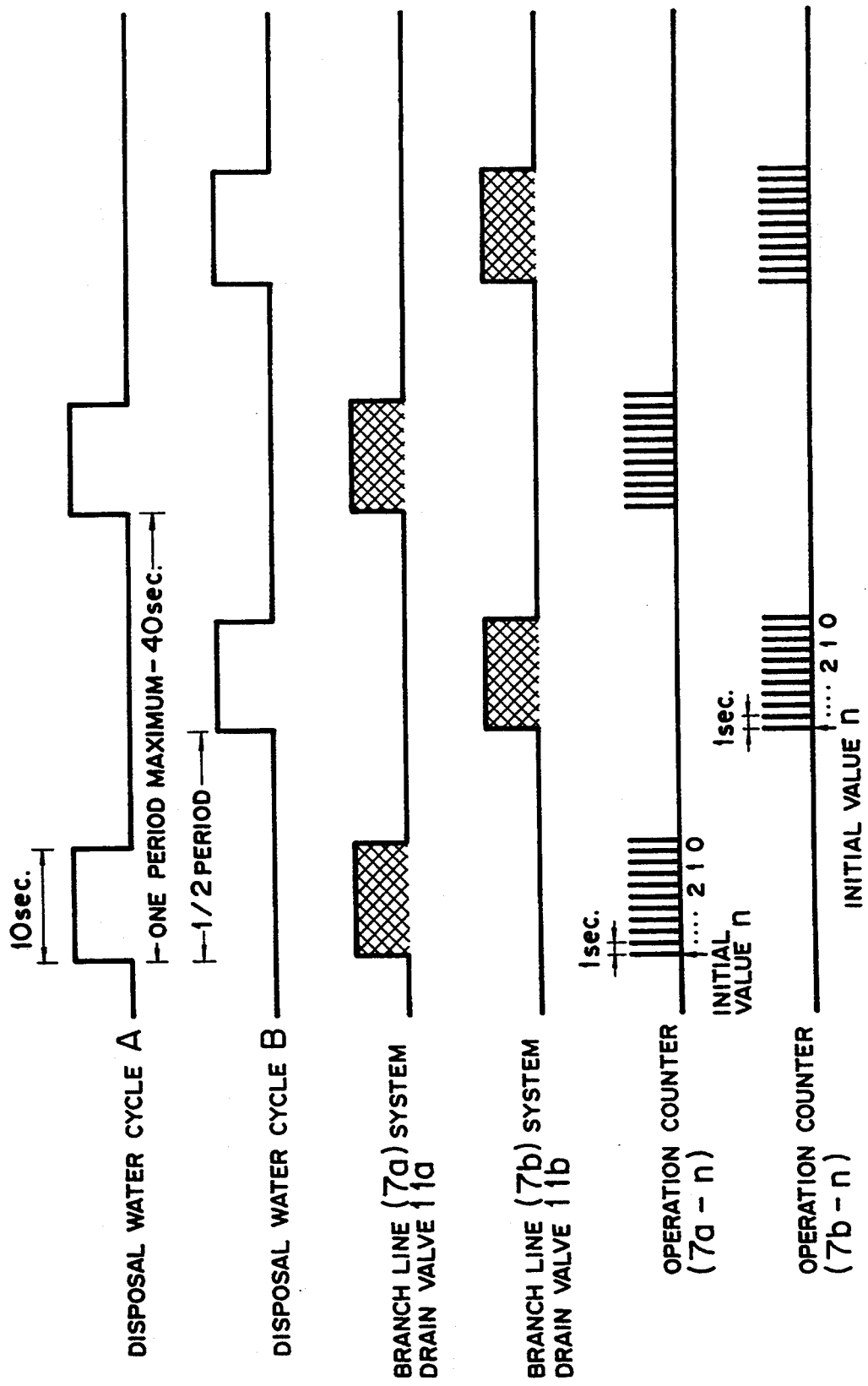

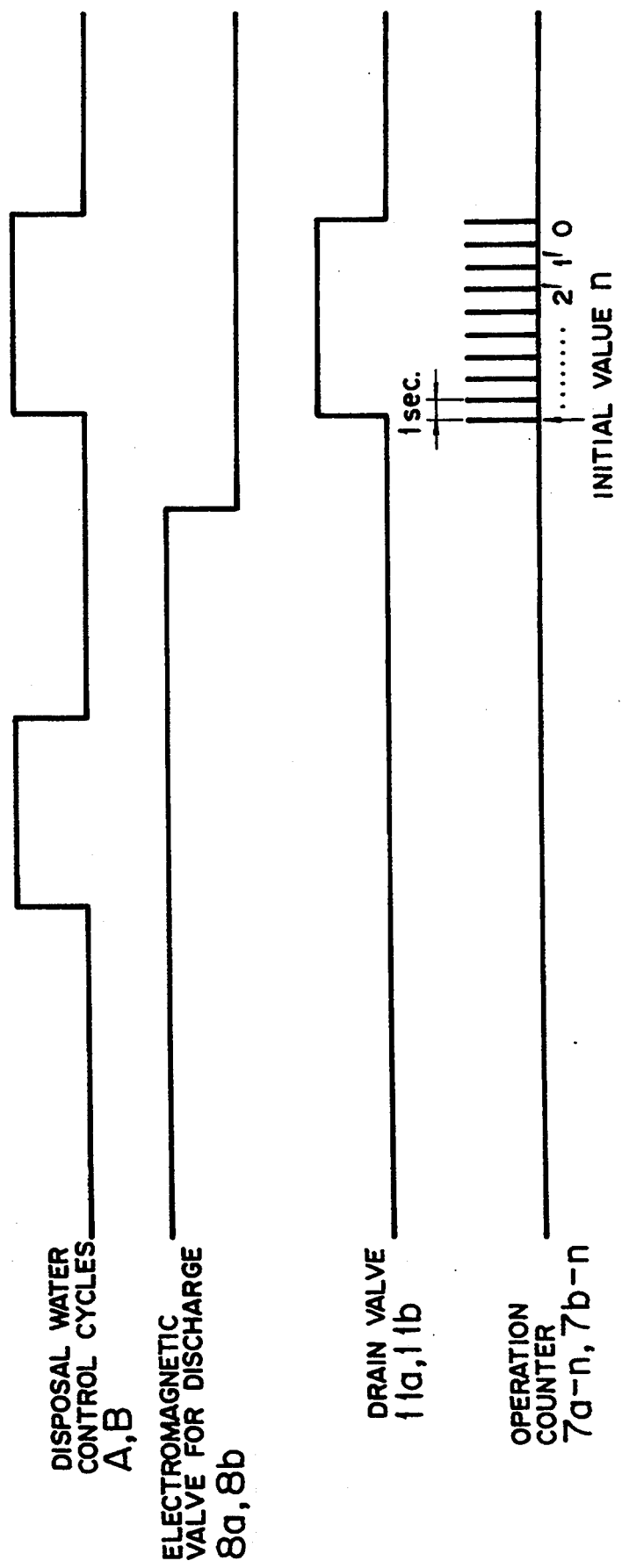

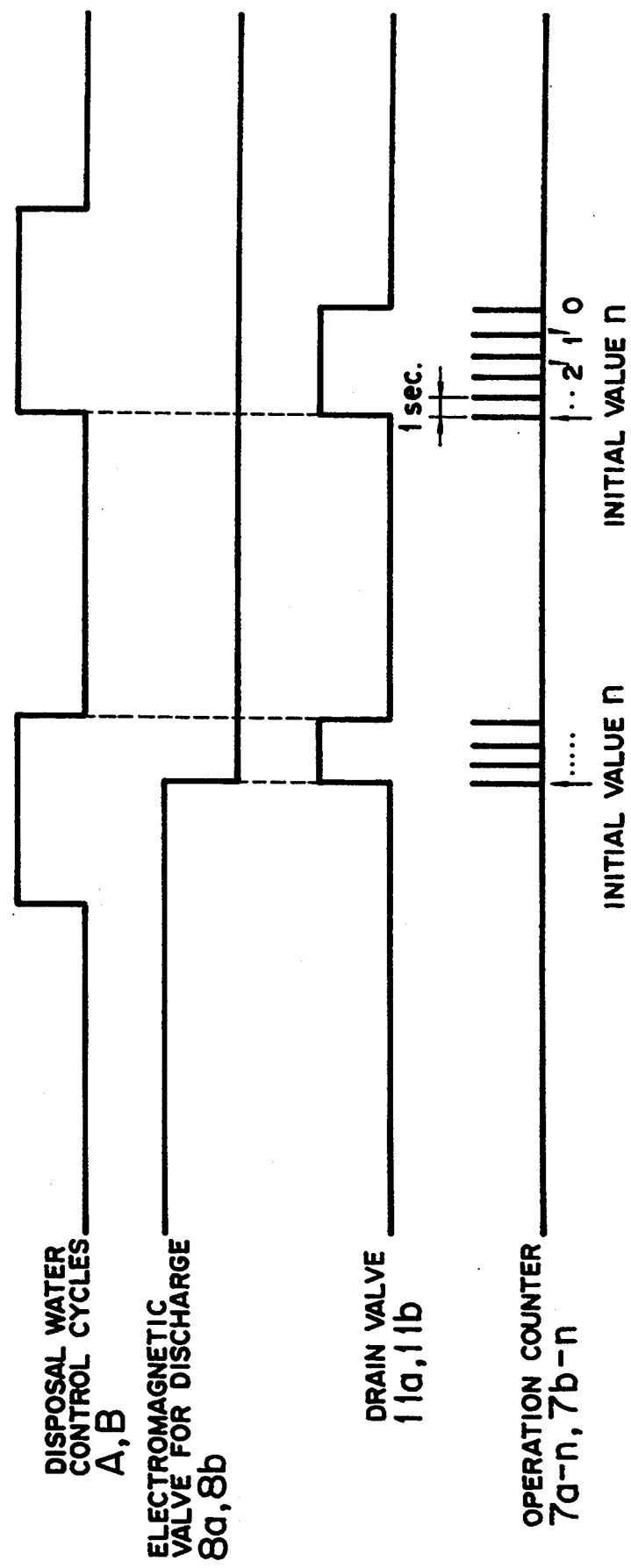

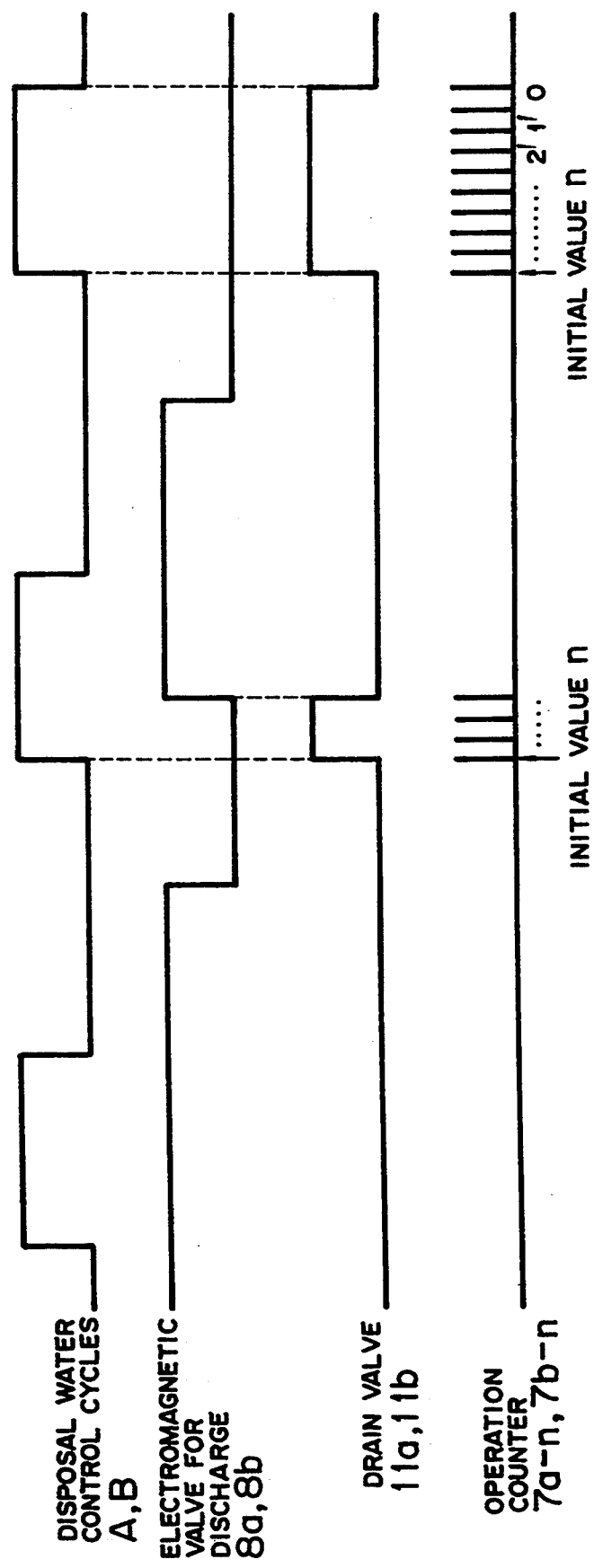

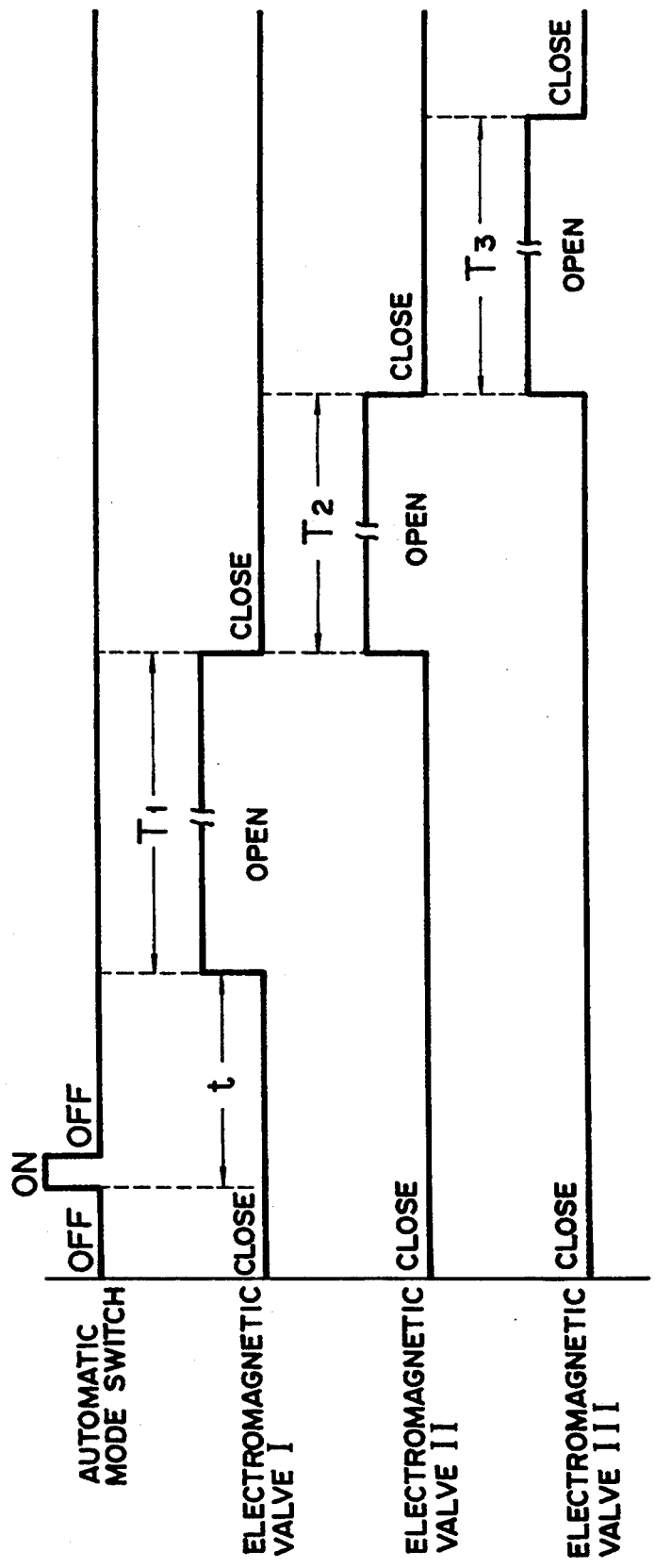

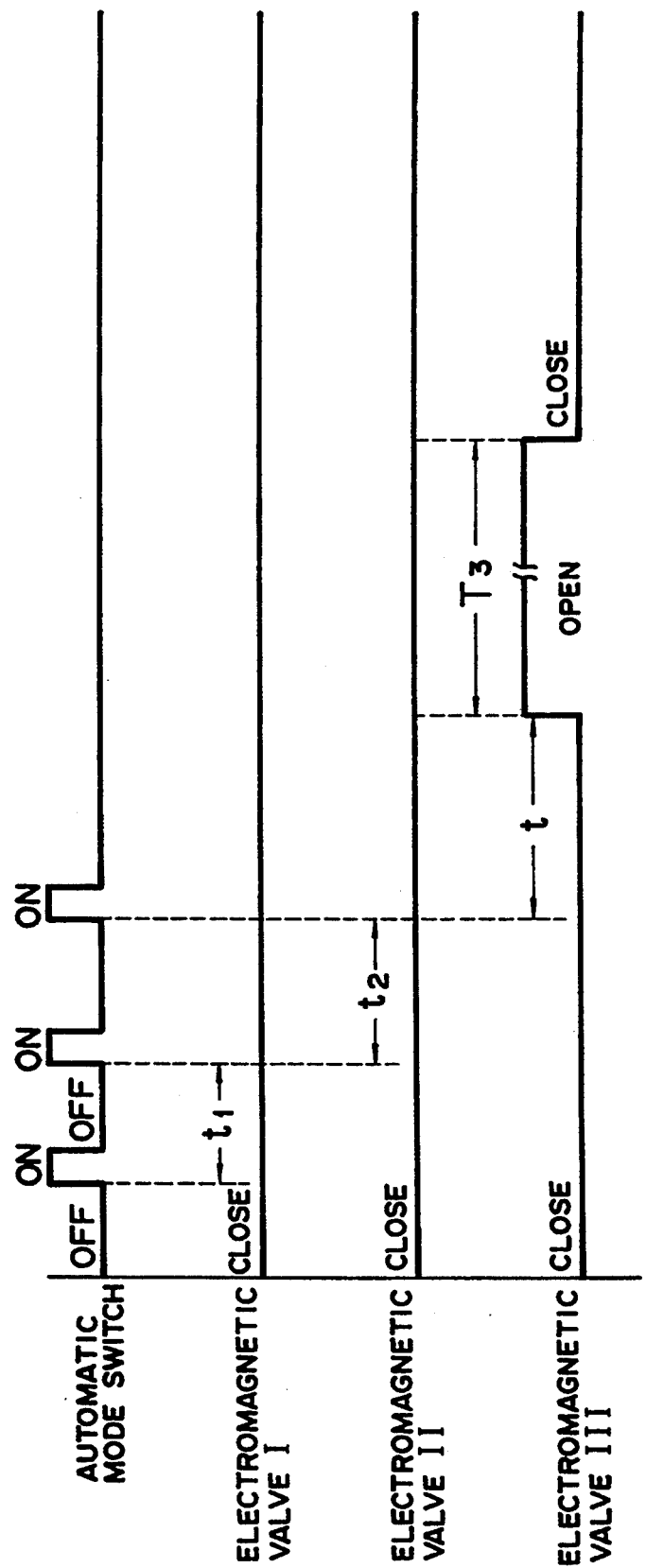

SHOWER APPARATUS

This application is a continuation of application No. 08/101,103, filed Aug. 3, 1993, now abandoned, which is a continuation of application Ser. No. 07/668,152, filed Mar. 12, 1991, now abandoned.

BACKGROUND OF THE INVENTION

1. Field of the Invention

The present invention relates to a shower apparatus. More specifically, the present invention relates to a shower apparatus which has a water-discharge function for simultaneously effecting a shower discharge from each of a plurality of shower discharge ports from a single position or a plurality of positions. A water disposal function for draining hot water remaining within a hot water passage is in communication with each shower discharge port and lowered in temperature before the succeeding shower discharge to prevent cold water from being discharged when a shower starts to be used. A function for programming water discharged from each shower discharge port is provided with an automatic control.

2. Detailed Description of the Prior Art

A known shower device system is disclosed in Japanese Utility Model Laid-Open No. 69913/1988.

FIG. 13 shows a shower apparatus provided with a number of shower discharge ports. This shower apparatus is so designed as to supply hot water from a hot water source (not shown) to the hot water side of a cold and hot water mixing cock 101 through a first hot water line 102, and deliver hot water, mixed to have a suitable temperature at said cold and hot water mixing cock 101, to each discharging electromagnetic valve 104 through a second hot water line 103 that is branched into two lines 103a and 103b.

The discharging electromagnetic valves 104 each, paired with each of drain valves 105, are arranged in parallel. A third hot water line 106 is in communication with various shower discharge ports $S_1$ to $S_5$ downstream of both the valves 104 and 105. Reference numeral 112, provided on the second hot water line 103, designates a stop valve. A drain line 108 is branched from the downstream side of the valve 112, and a drain valve 109 is provided in the drain line 108. A circulation line 111 is provided on a hot-water side check valve 110, of the hot and cold water mixing cock 101, to return hot water in the first hot water line 102 toward the hot water source, when necessary.

As time passes after each shower has been used, the temperature of hot water remaining in the first hot water line 102, the second hot water line 103 and the third hot water line 106 lowers. Accordingly, a person that the shower, later first bathes in cold water remaining in the hot water lines 106, 103 and 102.

In order to prevent the low-temperature water from being discharged at the begininng of use, it is necessary to replace cold water in the first, second and third hot water lines 102, 103 and 106 with new hot water before use. In the aforementioned shower apparatus, the hot water in the line 102 is returned to the hot water source through the circulation line 111 for circulation to thereby exchange hot water, whereas hot water in the second and third hot water lines 103 and 106 is replaced with new hot water by closing the stop valve 112 to stop hot water from entering lines 103 and 106 from the cold and hot water mixing cock 101, opening the drain valves 105 and 109 to allow the remaining hot water which has cooled to drain from the lines 103 and 106 by backflowing therethrough and exiting through drain line 108, and closing drain valves 105 and 109 and opening stop valve 112 to allow new hot water to flow into lines 103 and 106.

The aforementioned exchange of hot water using the circulation line 111 is called a circulation system, and the exchange of hot water by the drainage from the water discharge line 108 is called the water disposal of a water-removal system.

However, in the case of exchange of hot water in the first hot water line 102 according to the aforementioned circulation system of the shower apparatus, equipment of the circulation line 111 and a circulation mechanism (not shown) are necessary, resulting in a complexity of construction and an increase of execution and inspection cost.

Moreover, for example, when time passes without the use of a specific shower, the temperature of hot water remaining in the third hot water line 106, which is in communication with the shower discharge port, lowers. However, in the aforementioned shower apparatus, disposal of water, with respect to only the third hot water line 106 during the use of the shower cannot be effected. Therefore, when that shower is next used, the residual low temperature hot water in the third hot water line is discharged as it is, or the stop valve 112 is closed to stop the use of the shower as described above. Then hot water in both the second and third hot water lines 103 and 106 is removed from the drain valve 109 for disposal, after which new hot water should be introduced. It has taken a long time for such preparation.

Furthermore, a conventional shower apparatus has been disclosed, for example, in Japanese Utility Model Laid-open Publication No. 19291/1990, in which plural kinds of programs are provided and wherein the order of the opening and closing operations of the valves is different from each other, are stored in a controller section. Operating sections for selecting these programs are provided, in addition to a display section for displaying the whole discharge order of the programs. The kinds of showers and the like are provided close to the operating section so that the operating sections are operated in accordance with the display section whereby the programs corresponding thereto are executed. The opening and closing valves are opened for a predetermined time in a predetermined order.

However, in such a conventional shower apparatus, since discharge contents or the like are fixed for every program set in advance in the controller section, the discharge content cannot be suitably changed because of physical condition of a particular user, taste of individuals, etc, posing a problem that a very rigid automatic operation causes an inconvenience during use.

A further conventional shower apparatus is disclosed, for example, in Japanese Utility Model Laid-open Publication No. 70880/1987, in which a plurality of discharge ports of a body shower are vertically provided on the front surface of a shower tower, discharge ports of an overhead shower are downwardly provided at the upper part, and an opening and closing valve and a flow adjusting valve are provided in the midst of a hot water passage connected to each discharge port. This causes hot water in a preset instantaneous flow rate to be laterally discharged from the discharge port of the body shower by the operation of the operating section pouring hot water on the whole body except the head. The hot water, in a preset instantaneous flow rate, is discharged from the discharge port of the overhead shower and poured principally on the head.

However, in the conventional shower apparatus as described above, hot water or cold water is merely poured laterally or downwardly towards the lower half of the body, and therefore, the lower half of the body, more specifically, such as the waist, the hips, a thigh, the calf, the sole of a foot, etc. cannot be sufficiently stimulated from the bottom, posing a problem that these parts cannot be massaged.

It is then contemplated that discharge ports of an undershower are upwardly provided on the shower tower and hot water, in a preset instantaneous flow rate, is upwardly discharged from the discharge ports of the undershower similar to the body shower and the overhead shower by the operating section pours the hot water on the lower half of the body and the soles of feet.

However, in this case, when the discharge of the undershower starts, hot water, in a set instantaneous flow rate, is suddenly vigorously discharged from the discharge ports and violently poured on the lower half of the body and the soles of feet. As a result, the user is surprised and has a feeling of unrest using an unfamiliar undershower. In addition, the sudden discharge, when the operating section is erroneously operated, gives a user unpleasantness.

BRIEF DESCRIPTION OF THE DRAWINGS

FIGS. 6 and 7 are time charts showing water-disposal operation of a first and second hot water lines;

FIG. 8(A) is a time chart showing a water-disposal cycle of a third hot water line;

FIGS. 8(B) to 8(D) are respectively time charts showing operation of disposal water control cycle;

FIG. 9(A) is a time chart in case the step is not previously fed;

FIGS. 9(B) and 9(C) are respectively time charts showing one example in case the step is previously fed;

SUMMARY OF THE INVENTION

A first object of the present invention is to provide a shower apparatus in which the water disposal construction in a first, second and third hot water lines and operation thereof are made independently of each hot water line to rationally carry out exchange between disposal water and hot water suitable for the respective hot water lines, whereby preparation time required, to assume the state where the discharge of shower at a proper temperature is attained is shortened. After completion of preparation, hot water at a proper temperature can be discharged immediately for use of the showers.

A further object of the present invention is to provide a shower apparatus provided with a programmed discharge function, in which programmed discharge content can be changed during automatic control operation.

Another object of the present invention is to provide a shower apparatus for carrying out an undershower discharge towards particularly the lower half of a user's body in which the waist, the hip, the thigh, the calf, the sole of a foot, etc. are adequately stimulated while preventing sudden discharge when the undershower discharge starts.

DESCRIPTION OF THE PREFERRED EMBODIMENTS

Figure 1:
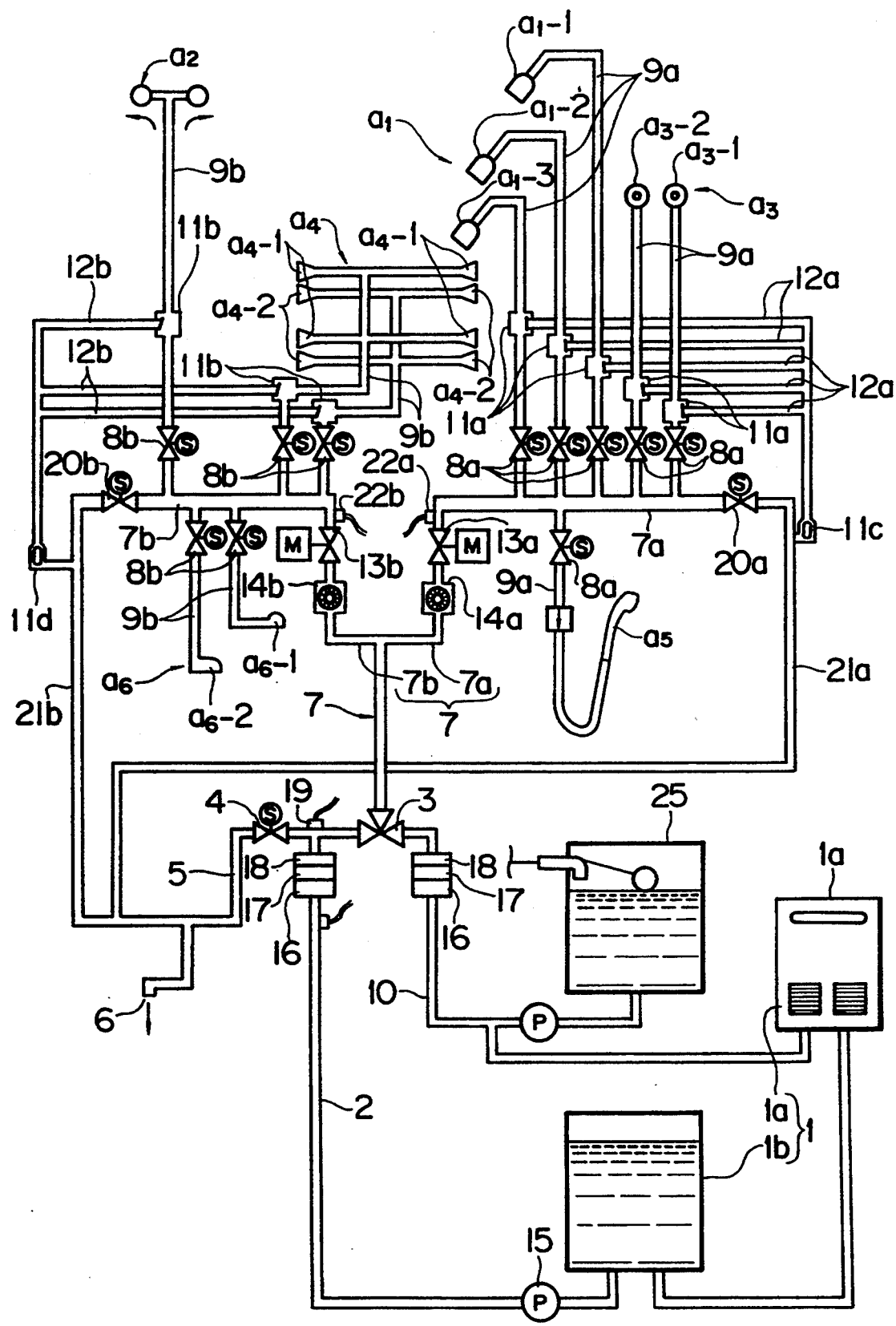
FIG. 1 is a schematic view of piping systems of a shower apparatus to which the present invention is embodied.
Figure 2:
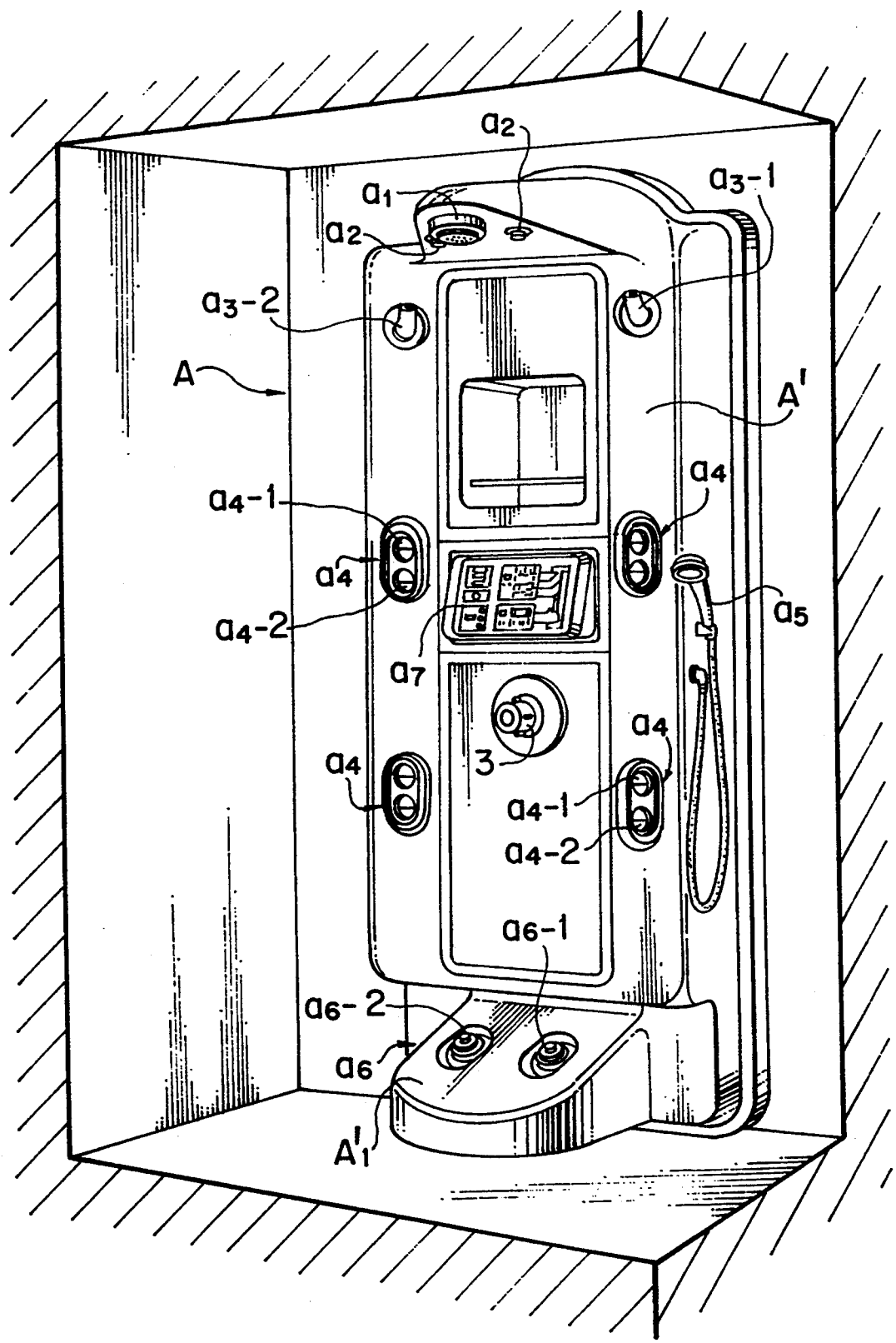
FIG. 2 is a perspective view of the shower apparatus.
Figure 3:
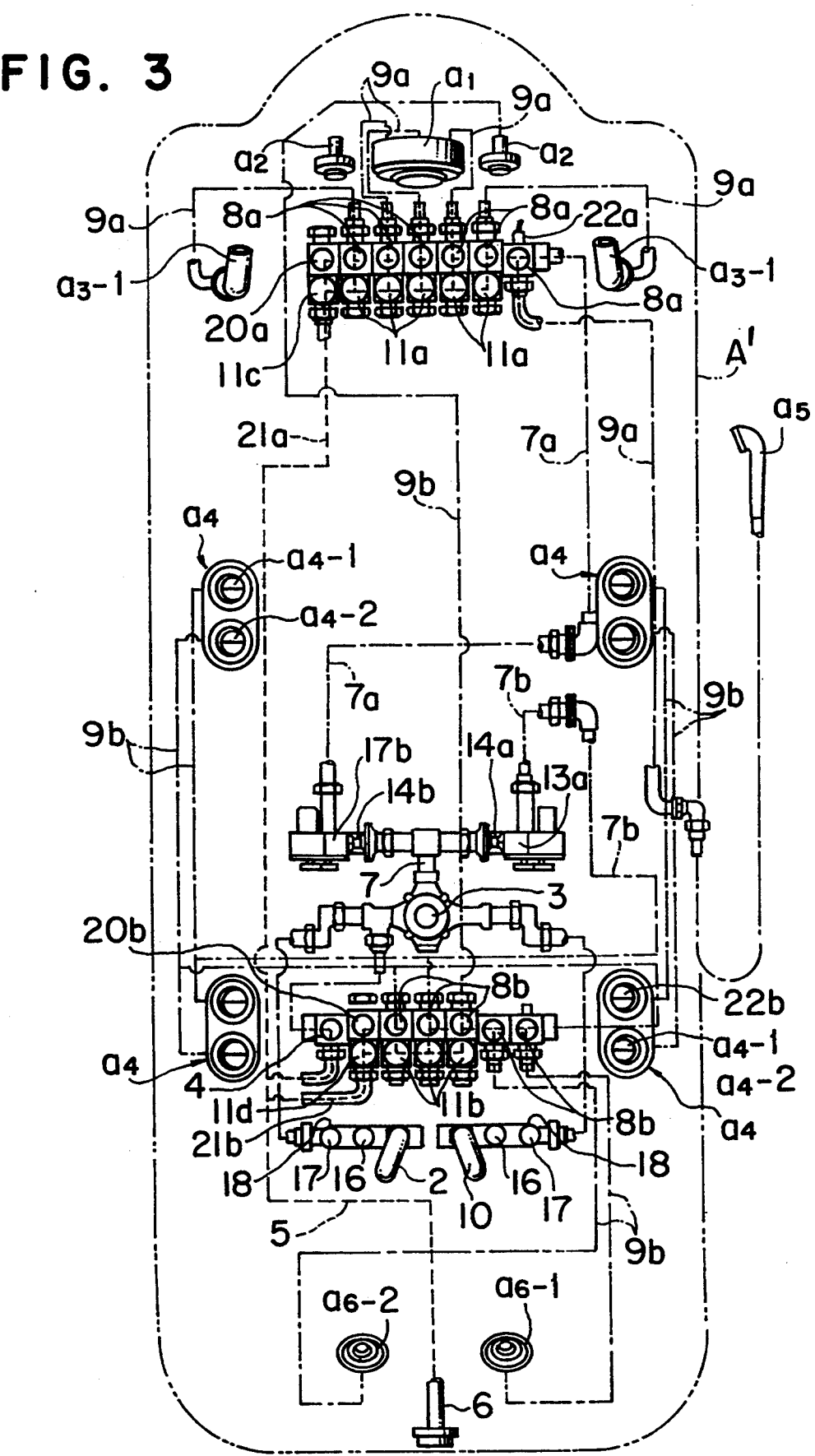
FIG. 3 is a view showing the piping with a part of the piping system of the shower apparatus omitted.

FIGS. 1 to 3 show a shower apparatus A according to an embodiment of the present invention. Various kinds of showers $a_1$ to $a_6$ are provided at portions on both sides and vertically of a tower body A' in the form of a panel. Discharge of these showers is controlled by a control section 50 (see FIGS. 4(A) to 4(F)) of which input means is an operating panel $a_7$ in the central portion of the front surface of the tower body A'.

FIG. 1 schematically shows piping systems of hot water and disposal water of the shower apparatus A. A section from a hot water source 1 to a hot water and cold water mixing cock 3 is connected by a first hot water line 2. A second hot water line 7, branching into two lines 7a and 7b, is connected on the secondary side of the hot water and cold water mixing cock 3. Discharge opening and closing valves (electromagnetic valves 8a and 8b in the present embodiment) are connected in parallel to both branch lines 7a and 7b. Third hot water lines 9a and 9b connected to the secondary sides of the electromagnetic valves 8a and 8b, respectively, are communicated with shower discharge ports $a_1$-1 to $a_6$-2. The actual piping system is partly omitted in FIG. 3.

The shower discharge ports $a_1$-1 to $a_6$-2 will be described. In FIGS. 1 to 3, reference numerals $a_1$-1, $a_1$-2 and $a_1$-3 designate a spray discharge port, massage discharge port and a soft (foam) discharge port, respectively. Actually, three discharge ports are incorporated into a single overhead shower $a_1$ as shown in FIGS. 2 and 3.

Numeral $a_2$ designates a microshower discharge port arranged on both sides of the overhead shower $a_1$, and shower water is discharged in the form of mist.

Numerals $a_3$-1 and $a_3$-2 provided upwardly on both sides of the tower body A', designate discharge ports for exposing hot water $a_3$, in which hot water obtained by releasing shower water upwardly to thereby fall in the form of beads on a shoulder or the like of a user.

Numerals $a_4$-1 and $a_4$-2 designate discharge ports of a body shower $a_4$. A set of two kinds of discharge ports, consisting of a spray discharge port $a_4$-1 and an intermittent (massage) discharge port $a_4$-2, are disposed at two parts on both sides of the tower body A' and are directed towards a user who stands up in front of the tower body A'.

Numerals $a_6$-1 and $a_6$-2, provided on the support-like portions under the tower body A', designate discharge ports of the undershower $a_6$, in which the sole of a foot or the like are massaged by shower water discharged upwardly.

A hand shower $a_5$ detachably provided on the side of the tower body A' is used to shampoo the hair of the head or the like.

On the other hand, the hot water source 1 includes several types, according to the specification thereof, one type wherein hot water is directly supplied from a hot water supply unit 1a, and the other type wherein hot water from the hot water supply unit 1a is first stored in a hot water tank 1b and then supplied. In case of the present embodiment, the latter is employed, in which hot water heated by the hot water supply unit 1a is stored in the hot water tank 1b, and then increased in pressure through a pressure pump 15, in which state the hot water is supplied from the first hot water line 2 towards the hot water and cold water mixing cock 3.

The hot water and cold water mixing cock 3 comprises a thermostat mixing valve. The first hot water line 2 is connected to a hot water port of the mixing cock 3. A water supply line 10 communicated with a water tank 25 is connected to a port of the mixing cock 3. A stop cock 16, a strainer 17 and a check valve 18 are provided in that order, in each of the first hot water supply line 2 and the water supply line 10, upstream of mixing cock 3.

Hot water mixed to the desired temperature by the hot water and cold water mixing cock 3 is supplied into the branch lines 7a and 7b of the second hot water line 7. When the electromagnetic valves 8a and 8b are opened, hot water is discharged from the shower discharge ports $a_1$—$a_6$-2 through the third hot water lines 9a and 9b.

In the shower apparatus A of the present embodiment, the first hot water line 2 and the second hot water line 7 are independently provided with the water disposal construction of the flow system. The third hot water lines 9a and 9b are provided with the water disposal construction of the water removal system.

A drain valve 4 is connected to mixing cock 3 by way of a pipe which includes thermistor 19, in accordance with what is shown in FIG. 1.

The opening and closing of the drain valve 4 is controlled by a control section 50. A drain line 5 is connected to the secondary side of the drain valve 4, the drain line 5 being communicated with a drain port 6 arranged at the lower part of the shower apparatus A.

Furthermore, a temperature thermistor 19, communicated with the control section 50 to control the open- and closing operation of the drain valve 4, is provided at upstream immediately above the drain valve 4 of the first hot water line 2 so that the temperature of hot water in the first hot water line 2 is measured by the temperature thermistor 19, and the measured information is transmitted to the control section 50.

The hot water supplied from the first hot water line 2 to the hot water and cold water mixing cock 3 is mixed with water from the water line 10, to a suitable temperature desired by a user, within the mixing cock 3, and the hot water flows into the second hot water line 7.

The second hot water line 7 is branched into a plurality of lines, for example, two branch lines 7a and 7b. In both branch lines 7a and 7b are installed water-quantity sensors 14a and 14b for measuring the flow rate of hot water passing through the branch lines 7a and 7b, flow rate adjusting valves 13a and 13b for adjusting the flow rate, and temperature thermistors 22a and 22b for measuring temperatures of hot water in the branch lines 7a and 7b from the upstream side.

Branch line 7a is connected to six diaphragm type electromagnetic valves 8a for opening and closing three shower discharge ports $a_1$-1, $a_1$-2, $a_1$-3, which exposes hot water discharge ports $a_1$-1, $a_1$-2, of the overhead shower $a_1$, and the hand shower $a_5$. Whereas, to the other branch line 7b is connected to five diaphragm type electromagnetic valves 8b for the microshower discharge port $a_2$, undershower discharge ports $a_6$-1 and $a_6$-2, and body shower discharge ports $a_4$-1 and $a_4$-2.

The showers $a_1$–$a_6$ are divided into two systems, one for $a_1$, $a_3$ and $a_5$ communicated with the branch line 7a of the second hot water line 7, and the other for $a_2$, $a_4$ and $a_6$ communicated with the branch line 7b. For example, when the desired electromagnetic valves 8a and 8b are opened one by one, showers communicated with the different branch lines 7a and 7b like the overhead shower $a_1$, the body shower $a_4$, the hand shower $a_5$ and the body shower $a_4$ are simultaneously discharged. The flow rate of hot water supplied to the both branch lines 7a and 7b is adjusted to the optimum flow rate corresponding to the kind of the shower discharge ports $a_1$-1 to $a_6$-2 opened in the branch lines 7a and 7b by the automatic control of the flow adjusting valves 13a and 13b.

Drain valves 20a and 20b comprising, for example, electromagnetic valves or the like are provided at the downstream end with respect to the branch lines 7a and 7b of the second hot water line 7. Second drain lines 21a and 21b connected to the secondary side of valves 20a, 20b and are communicated with the drain line 5.

Drain valves 11a and 11b for disposal water comprising, for example, electromagnetic valves or the like are provided at the downstream side of the electromagnetic valves 8a and 8b in the third hot water lines 9a and 9b for communication between the electromagnetic valves 8a and 8b and the shower discharge ports $a_1$-1 to $a_6$-2. Third drain lines 12a and 12b are connected to the secondary side of the drain valves 11a and 11b, these lines being gathered and communicated with second drain lines 21a and 21b through common drain valves 11c and 11d.

The common drain valves 11c and 11d comprise backflow preventive valves, which are opened following the drain valves 11a and 11b to discharge the collected drain into the second drain lines 21a and 21b.

In FIG. 1, some drain valves 11a and 11b are not positioned immediately downstream of the electromagnetic valves 8a and 8b for the purpose of simplicity but actually, as shown in FIG. 3, the electromagnetic valve 8a of the diaphragm type and the drain valve 11a comprising an electromagnetic valve of the direct-driven type, and similar electromagnetic valve 8a and the drain valve 11b are respectively integrally formed into a unit, which is connected in a lateral row.

The electromagnetic valves 8a, 8b, the flow adjusting valves 13a, 13b and the drain valves 4, 20a, 20b, 11a, 11b for disposal water provided in the first, second and third hot water lines 2, 7, 9a, 9b are electrically communicated with the control section 50 which performs the input operation from the operating panel a7 in the central portion of the tower body A' as described above. Disposal of water in the first, second and third hot water lines 2, 7, 9a and 9b and discharge from the shower discharge ports a1-1 to a6-2 are carried out by the control of the control section 50.

Figure 4A:
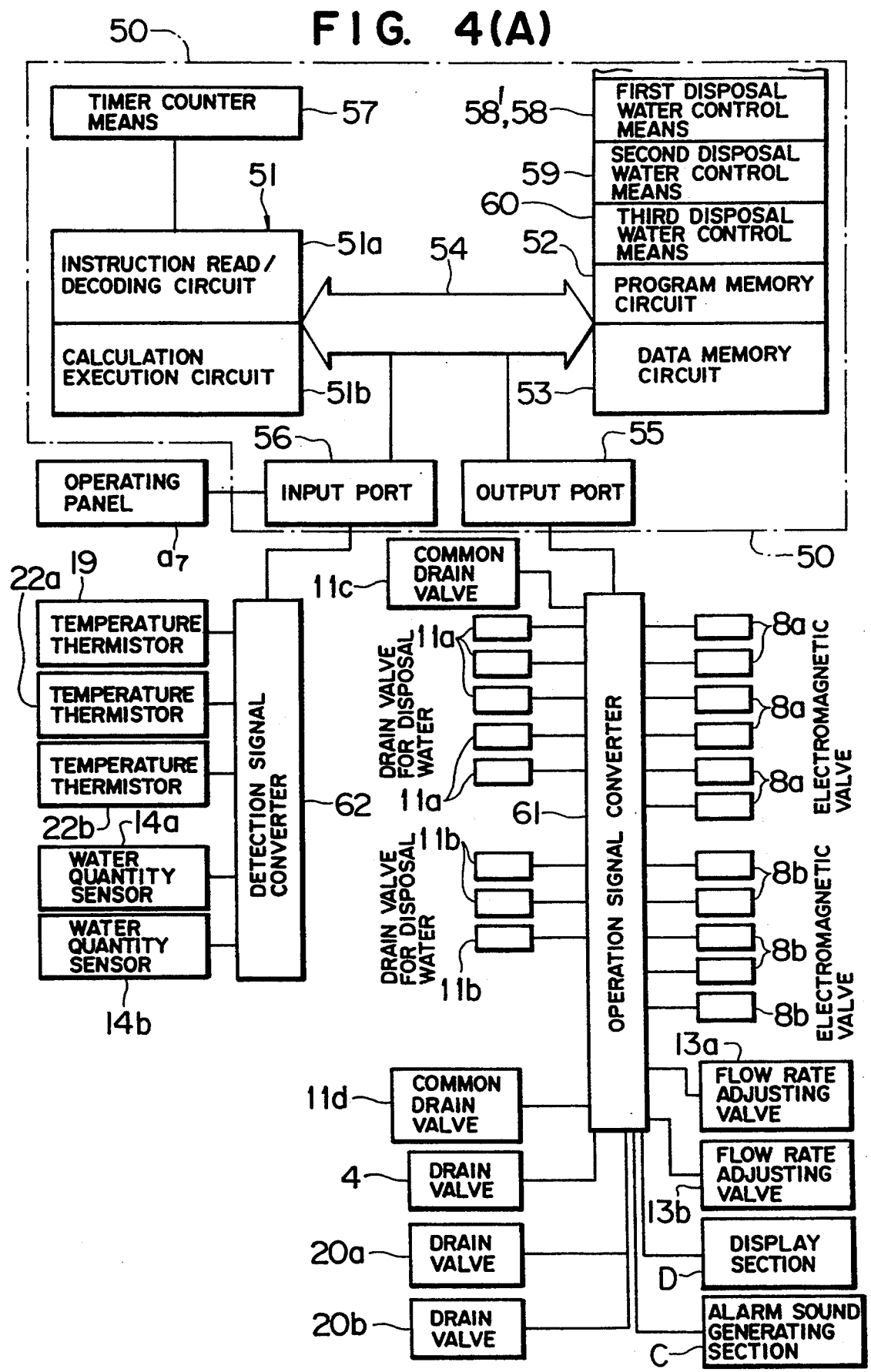
FIG. 4(A) is a block diagram showing the relationship between an operation control section and an electromagnetic valve, a drain valve and a temperature thermistor.

FIG. 4(A) is a block diagram showing the connection between the control section 50 and the electromagnetic valves 8a, 8b, drain valves for disposal water 4, 20a, 20b, 11a, 11b, temperature thermistors 19, 22a, 22b and the like.

Figure 4B:
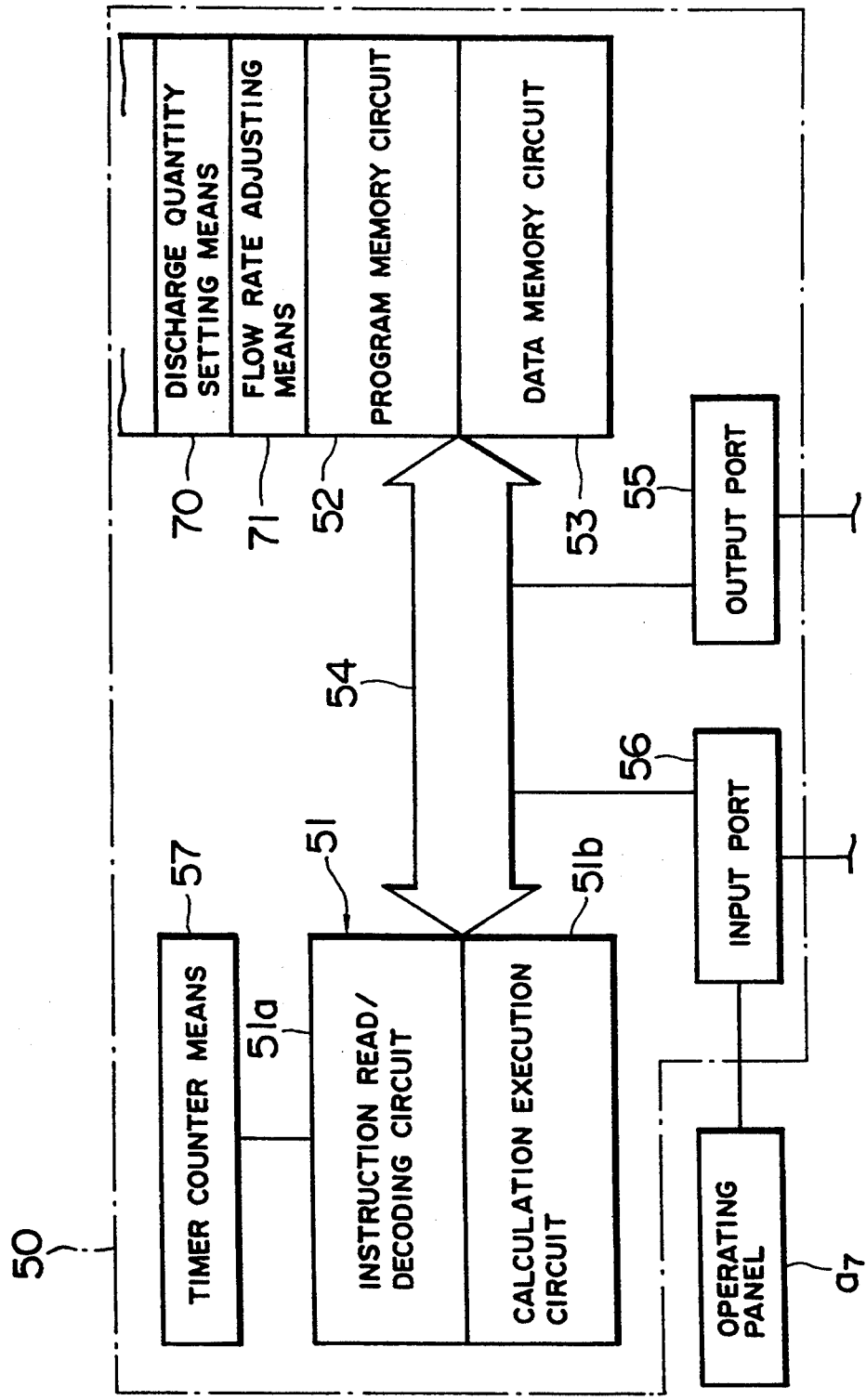
FIGS. 4(B) to 4(F) are respectively block diagrams showing various means provided on the control section.

The control section 50 causes a central processing unit 51 comprising an instruction read and decoding circuit 51a, a calculation and execution circuit 51b and a timer counter means 57 to communicate with a memory circuit section through a data bus 54. The memory circuit section comprises a program memory circuit 52 for storing basic control programs of the shower apparatus A in the present embodiment and a data memory circuit 53 for writing and reading data. The memory circuit section is partly parallel with a first disposal water control means 58, a second disposal water control means 59 and a third disposal water control means 60, which are discribed later, and many other control means as shown in FIGS. 4(B) and 4(F).

Further, an input port 56 and an output port 55 are connected to the data bus 54. An operating panel a7 for carrying out operations such as discharge, stopping and flow control of showers, and a detection signal converter 62 are connected to the input port 56 whereas an operation signal converter 61 is connected to the output port 55.

To the detection signal converter 62 are connected a temperature thermistor 19 of the first hot water line 2, temperature thermistors 22a and 22b of both branch lines 7a and 7b of the second hot water line 7, and water quantity sensors 14a, 14b provided on both branch lines 7a and 7b, respectively. Detection signals having a hot water temperature and flow rate obtained as analog values therefrom are converted into digital values, which are sent to the input port 56 of the control section 50.

When the detection signal of the hot water temperature or flow rate is inputted into the input port 56, the central processing unit 51 repeatedly executes reading, decoding and calculation on the basis of the basic program and the first, second and third disposal water control means 58, 59 and 60 with the detection signal data as a reference and as a result, outputs the operation signal towards the output port 55 when necessary. The operation signal outputted as the digital value to the output port 55 is converted into the analog value by the operation signal converter 61, and further amplified, after which it is applied to each of the predetermined electromagnetic valves 8a, 8b, communicated with the converter 61.

To the operation signal converter 61 are connected a drain valve 4 of the first hot water line, drain valves 20a and 20b of both branch lines 7a, 7b of the second hot water line 7, common drain valves 11c, 11d, flow rate adjusting valves 13a, 13b, six electromagnetic valves 8a on the side of the branch line 7a, five disposal water drain valve 11a, five electromagnetic valves 8b on the side of the branch line 7b and three disposal water drain valve 11b.

Figure 5:
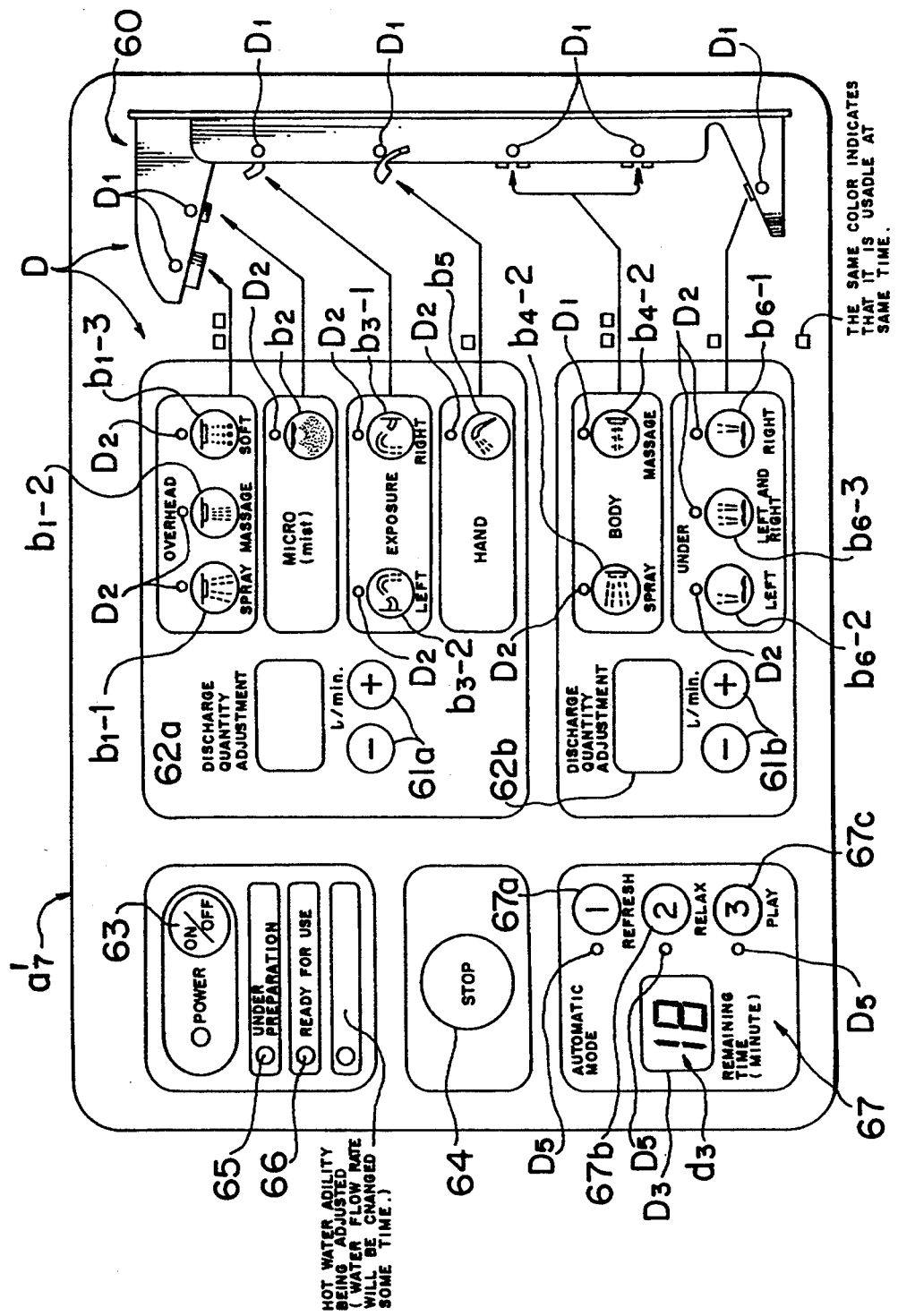
FIG. 5 is a front view of an operating panel.

FIG. 5 shows a panel surface a7' of an operating panel a7, in which a rough picture 60 of the shower body A' is depicted on the right side on the panel, and water discharge operating switches b1-1 to b6-3 corresponding to discharges from shower discharges a1-1 to a6-2 are arranged in the central portion of the panel surface a7'. Reference numerals 61a and 61b designate discharge quantity adjusting buttons. The buttons 61a and 61b (+ and −) are depressed whereby the discharge quantity per minute of the using shower is adjusted, and the discharge quantity is displayed on discharge amount display sections 62a and 62b. On the left side of the panel surface, numeral 63 designates a power switch, and 64 is a stop water switch used in emergency.

When using the shower, if the power source 63 of the operating panel a7 is turned "ON", the operation control section 60 is started so that the temperature thermistors 19, 22a and 22b and the water quantity sensors 14a and 14b start the detection of the hot water temperature and flow rate in the respective hot water lines.

On the other hand, as the time passes since the shower was last used, the temperature of the water remaining in the first and second water lines decreases.

The first disposal water control means 58 of the control section 50 has the function, which in the case where the hot water temperature of the first hot water line 2 is less than a predetermined level, for example, less than 47° C. ±3° C., of opening the drain valve 4 so that new hot water from the hot water source 1 is disposed from the drain line 5 till the hot water in the first hot water line 2 assumes a temperature in the range of 47° C. ±3° C.

Thereby, as shown in the time chart of FIG. 6, in the case when the power switch 63 is "ON", the detection temperature by the temperature thermistor 19 of the first hot water line 2 is less than 47° C. ±3° C. The first disposal control means 58 of the control section 50 is executed to output the operation signal by which the drain valve 4 is opened. When the drain valve 4 is opened, the low temperature water in the first hot water line 2 is disposed directly before the hot water port of the hot water and cold water mixing cock 3 and drained outside from the drain port 6 through the drain line 5.

When water is disposed so that low temperature hot water is extruded by new hot water and hot water in the first hot water line 2 is replaced by new hot water sent from the hot water tank 1b, the hot water temperature in the first hot water line 2 rises to a predetermined level as described above. When the operation control section 50 knows it by the presence of the detection signal from the temperature thermistor 19, the first disposal water control means 58 outputs an operation signal by which the drain valve 4 is closed to terminate the disposal of water.

As described above, the disposal water in the first hot water line 2 causes the low temperature hot water remaining in the first hot water line 2 to be replaced by new hot water from the hot water source 1 by opening the drain valve 4 directly before the hot water and cold water mixing cock 3. As compared with the conventional circulation system, the construction is considerably simplified by a portion in which a circulation mechanism is not necessary. It is possible to exchange hot water having a predetermined temperature directly before the hot water and cold water mixing cock 3 in a short period of time and to positively prevent low temperature water from being mixed.

The first disposal water control mechanism 58 may be provided with disposal water stop means which is provided for defective operation of the hot water supply unit 1a. When disposing water in the first hot water line 2, when the hot water in the first hot water line 2 does not reach the aforesaid predetermined temperature within a predetermined time due to the defective operation of the hot wafer supply device 1a unit or the like, the drain valve 4 is closed to stop the disposal of water. For example, in the case where when the opening time of the drain valve 4, that is, the disposal water time reaches three minutes, temperature of hot water in the hot water line 2 does not rise to 47° C. ±3° C., there is a possiblity of occcurrence of defective operation of the hot water supply unit 1a, and therefore, at that time, the first disposal water control means 58' stops the disposal of water (FIG. 6—Defective preparation).

Accordingly, if the aforementioned first disposal water control mechanism 58' is provided, in the state where the hot water from the first hot water line 2 is supplied at a low temperature or in the form of water due to the defective operation of the hot water supply unit 1a, it is possible to prevent inconveniences in operation wherein disposal of water from the drain valve 4 of the first hot water line 2 is continuously carried out.

As described above, in the case where disposal of water in the first hot water line 2 is terminated as scheduled and the hot water in the hot water line 2 is maintained at a predetermined temperature, the second disposal water control mechanism 59 of the control section 50 is continuously executed.

The second disposal water control mechanism 59 has the control function such that when the hot water temperature in the first hot water line 2 is maintained at a predetermined level, the drain valves 20a and 20b of the second hot water line 7 are opened for a predetermined time or the drain valves 20a and 20b are opened till the hot water in the line 2 reaches a predetermined temperature to effect disposal of water.

The second disposal water control mechanism 59 in the present embodiment outputs an operation signal by which both drain valves 20a and 20b of the branch lines 7a and 7b are opened for a predetermined time, for example, for 5 seconds, simultaneously with the opening of the drain valve 4 to dispose water from both second drain lines 21a and 21b whereby hot water in both the branch lines 7a and 7b is replaced by new hot water from the hot water and cold water mixing cock 3 (FIG. 6).

The aforesaid opening time of the drain valves 20a and 20b is determined by experimentally measuring in advance enough time to replace the residual hot water in the branch lines 7a and 7b of the second hot water line 7 with new hot water, the time in the present embodiment being set to five seconds.

Alternatively, the replacement of the hot water in the second hot water line 7 can by accomplished by continuously carrying out disposal of water till the hot water temperature in the branch lines 7a and 7b reaches the aforesaid predetermined temperature (for example, 33° C. ±3° C.) with the hot water temperature in the branch lines 7a and 7b detected by the temperature thermistors 22a and 22b as a reference of control.

As described above, the disposal of water in the second hot water line 7 is accomplished by the discharge of water from the drain valves 20a and 20b at the downstream end of both branch lines 7a and 7b simultaneously with the supply of new hot water from the hot water and cold water mixing cock 3. Therefore, there is an advantage that the control management of the disposal water operation regardless of time management or temperature management can be carried out relatively easily.

It is possible to replace the residual hot water in both branch lines 7a and 7b with hot water having an optimum temperature, for example, even by making piping conditions of both branch lines 7a and 7b constant so that the disposal of the low temperature hot water remaining in the branch lines 7a and 7b is carried out for a predetermined time by control of time management alone.

According to the above-described proposal, the temperature thermistors 22a and 22b are not required, and the construction and operation control section can be simplified accordingly.

An in-preparation lamp 65 on the operating panel a7 flickers during disposal of water in both first and second hot water lines 2 and 7 being carried out, and upon termination of the disposal of water, a "usable" lamp 66 is lit.

According to a partial modification of the second disposal water control means 59, the disposal of water in the second hot water line 7 can be separately executed for both branch lines 7a and 7b. For example, in the case where only the hot water in the branch line 7a is at a low temperature less than a predetermined level, only the drain valve 20a is singly opened to effect the disposal of water in the branch line 7a and at the same time, water can be discharged from the showers $a_2$, $a_4$ and $a_1$ communicated with one branch line 7b.

The operation control of the disposal water of both the first and second hot water lines 2 and 7 is carried out in the case where the shower apparatus A is initially started. Both the first and second disposal wafer control mechanism 58 and 59 have the function that as shown in the time chart of FIG. 7. In the case where the power source remains ON even after termination of the previous use of shower, for a fixed time, for example, at the time when 10 minutes have passed after the water discharge operating switches $b_1$-1 to $b_6$-3 of showers are finally depressed to stop water of the previous shower, that is, at the time of estimation that the hot water temperature in the first hot water line 2 is lower than a predetermined temperature, the water disposal of the first and second hot water lines 2 and 7 is executed in a manner similar to that described above so that the hot water in both the first and second hot water lines 2 and 7 is maintained at a level above a predetermined temperature.

It is to be noted that at the time of water disposal of the first hot water line 2, in the case where even if the water disposal is continued for three minutes, the hot water temperature in the hot water line 2 does not reach a predetermined temperature, water is stopped in a manner similar to that described above (FIG. 7—re-preparation is defective).

In the case of the shower device A of the preferred embodiment of the present invention, even if the hot water in the first hot water line 2 is kept at a temperature more than a predetermined value, the drain valves 20a and 20b are opened and the disposal water within the second hot water line 7 is simply carried out, when the water discharge operation switches $b_1$-1 to $b_6$-3 are depressed to use the shower and when the hot water temperature within either the branch line 7a or 7b of the second hot water line 7 is less than a predetermined value. For example, when the body shower $a_4$ is used with hot water after the overhead shower $a_1$ is used with cold water, the body shower $a_4$ is used with hot water, and then the water discharge operation switches $b_1$-1 to $b_1$-3 of the overhead shower $a_1$ are depressed or the like.

As described above, the second hot water line 7 is independent as a disposal water system line and divided into the branch lines 7a and 7b, so that water is discharged for a predetermined time from the drain valves 20a and 20b at the downstream ends of both the branch lines 7a, 7b while supplying hot water, having an optimum temperature, from the hot water and cold water mixing cock 3 for disposal of water. Therefore, it is possible to replace the low temperature residual hot water with optimum temperature hot water. The preparation of optimum temperature discharge can be promptly finished.

When after the power source has been turned ON, the water disposal of both the first and second hot water lines 2 and 7 is terminated and the preparation is completed, the "usable" lamp 66 is lit so that the shower operating switches $b_1$-1 to $b_6$-3 of the operating panel $a_7$ become effective. Thereafter, by depressing one of the water disposal switches $b_1$-1 to $b_6$-3 of the showers as desired, the control section 50 outputs an operation signal for opening the electromagnetic valves 8a and 8b of the shower discharge ports $a_1$-1 to $a_6$-2 as desired so that the optimum temperature hot water in the second hot water line 7 is immediately discharged.

Since the hot water pressure from the hot water source 1 is limited, the shower apparatus A, in the present embodiment, can be used while switching the showers $a_1$ to $a_6$ to any one of them or can be used by simultaneously discharging hot water from one kind of the showers $a_1$, $a_3$ and $a_5$ supplied with hot water from the branch line 7a and the showers $a_2$, $a_4$ and $a_6$ supplied with hot water from the branch line 7b as in the overhead shower $a_1$ and body shower $a_4$, the hand shower $a_5$ and body shower $a_4$, and the undershower $a_6$ and overhead shower $a_1$ and switching a combination of these showers according to user's taste. While the combination or switching operation of these showers can be carried out manually by the user, it is to be noted that in the present embodiment, several discharge programs, for example, three programs, are incorporated in advance into the control section 50 to select and execute automatic mode switches 67a, 67b and 67c of the operating panel $a_7$. Thereby, the discharges from the showers $a_1$ to $a_6$ are connected as intended, and the effective shower bath can be easily enjoyed.

Moreover, since the shower discharge ports $a_1$-1 to $a_6$-2 are different in kind, the optimum discharge quantities are also different according to the respective discharge ports. Thus, the shower apparatus A, according to the present embodiment, controls so that the flow rate adjusting valves 13a and 13b are adjusted while the quantity of water flowing through both the branch lines 7a and 7b, being detected by the water quantity sensors 14a and 14b of the branch lines 7a and 7b, whereby the optimum quantity of hot water is discharged from the shower discharge ports $a_1$-1 to $a_6$-2 from which hot water is discharged in both the branch lines 7a and 7b.

The quantity of discharge from the shower discharge ports $a_1$-1 to $a_6$-2 is maintained at the optimum flow rate during the discharge, and the value thereof is displayed on the water disposal amount display sections 62a and 62b. However, the + and − buttons 61a and 61b are depressed to change the discharge set value to a value as desired, whereby the control section 50 outputs an operation signal for increasing or decreasing an opening degree to the flow rate adjusting valves 13a and 14a to realize the set discharge quantity on the water disposal amount display sections 62a and 62b while interpreting detected signals of water amount sensors 14a, 14b.

When the used shower is stopped, hot water not discharged from the shower discharge ports remains within the third hot water lines 9a and 9b of the shower discharge ports $a_1$-1 to $a_4$-2 except the undershower $a_6$ and the hand shower $a_5$. However, the control section 50 opens the drain valves 11a and 11b corresponding to the showers after the shower is stopped to dispose the residual water.

The control section 50 has the control function to open the drain valves 11a, 11b of the third hot water lines 9a and 9b of the showers $a_1$ to $a_6$ and the common drain valves 11c and 11d every time after use so as to dispose hot water remaining in the third hot water lines 9a and 9b.

Thereby, for example, in the case where the showers $a_1$, $a_3$ and $a_5$ communicated with the branch line 7a of the second hot water line and the showers $a_2$, $a_4$ and $a_6$ communicated with the branch line 7b are simultaneously discharged one by one under a selection of the automatic mode switches 67a, 67b and 67c by depressing each of them. The operation is continued while successively switching the combination of these shower discharges. The third disposal water control mechanism 60 outputs an operation signal for opening the drain valves 11a and 11b of the shower discharge ports $a_1$-1 and $a_6$-2 with the electromagnetic valves 8a and 8b closed, and the common drain valves 11c and 11d for a predetermined time.

The third disposal water control means 60 forms two systems A and B of water cycles as shown in FIG. 8 after the power source is turned ON.

Both the disposal water cycles A and B have a cycle of one period (40 seconds) consisting of an operation period (10 seconds) and a stop period (30 seconds), for example. Both cycles simultaneously progress with a phase deviated by a $\frac{1}{2}$ period as shown.

The water disposal of the showers $a_1$, $a_3$ and $a_5$ on the branch line 7a side of the second hot water line 7 is executed within the operation period of 10 seconds immediately after the stoppage of water in the water cycle A. The water disposal of the showers on the branch line 7b side is executed within the operation period immediately after the stoppage of water in the water cycle B.

The operation signal outputted from the third disposal control mechanism 60 is executed within the operation period of 10 seconds in both the disposal water cycles A and B so that at the time when the drain valves 11a and 11b are opened, intial values of opening time corresponding to the shower discharge ports $a_1$-1 to $a_6$-2 are placed on operation counters 7a-n and 7b-n assigned to the drain valves 11a and 11b and immediately thereafter, subtraction is made, for example, per second. At the time when the operation counter is zero, the opened drain valves 11a and 11b are closed (FIG. 8(A)).

As described above, the third disposal control mechanism 60 generates an output signal only in its operation period to open the drain valves 11a and 11b, but has three operation cases as follows:

In the first case, a shower is stopped at the stop period of the disposal water control cycles A and B. The drain valves 11a and 11b are opened simultaneously with the start of the operation period of the next cycle to discharge water, and upon the termination of drainage, the drain valves 11a and 11b are closed to stop drainage (FIG. 8(B)).

In the second case, the showers $a_1$ to $a_6$ are stopped at the operation period of the disposal water control cycles A and B. The drain valves 11a and 11b are opened simultaneously with the stoppage of the showers and water is drained during the operation period. A portion having not been drained during the operation period is drained by opening the drain valves 11a and 11b again at the operation period of the next cycle (FIG. 8(C)).

In the third case, the discharge is begun again from the same showers $a_1$ to $a_6$ during the drainage. The drain valves 11a and 11b are closed simultaneously with the start of discharge to stop the drainage, and the drain valves 11a and 11b are again opened at the operation period after stoppage of water to drain water (FIG. 8(D)).

The time of drainage is controlled by operation counters $7_{a-n}$ and $7_{b-n}$ corresponding to the drain valves 11a and 11b, as described above, so that counted values from the start of drainage are subtracted at intervals of one second, and when zero is reached, the drainage is completed. The operation counters $7_{a-n}$ and $7_{b-n}$ are designed so that when the operation period is terminated before the counted value assumes zero, counted values are subtracted over the operation period of the succeeding cycle.

When the discharge from the showers $a_1$ to $a_6$ of the third hot water lines 9a and 9b with which are communicated the third drain lines 12a and 12b is re-started during counting, that is, during drainage, the operation counters $7_{a-n}$ and $7_{b-n}$ return the count to the initial value and again start count-down from the initial value after stoppage of water.

The disposal of water of the showers $a_1$, $a_5$ and $a_5$ in the branch line 7a system and that of the showers $a_2$, $a_4$ and $a_6$ in the branch line 7b system are carried out to be deviated from each other, because drain valves 11a, 11b and electromagnetic valves 8a, 8b are allowed to be operated without trouble and the control is made to be simplified. The stop period of the aforementioned disposal water cycles A and B can be shortened to about 10 seconds and one period, in this case it can be shortened to approximately 20 seconds.

As described above, the drain valves 11a and 11b of the third hot water lines 9a and 9b are individually independently operated by the operation control of the disposal water control mechanism 60 so that the hot water remaining in the third hot water lines 9a and 9b is disposed for every shower for which discharge is stopped.

Therefore, it is not necessary to dispose the hot water in the third hot water line through the second hot water line as in prior art. Water is disposed while successively continuing the use of the showers $a_1$ to $a_6$ whereas water in the third hot water lines 9a and 9b of showers for which discharge is stopped is disposed, so as to be provided for next use when the interior of the hot water lines 9a and 9b is empty. Thereby, water can be immediately discharged when using showers without admixture of low temperature hot water from any shower and temperature drop with the passage of time.

It is to be noted that the second hot water line in the aforementioned shower apparatus need not be branched but is designed to be a single system line, and a drain valve can be provided downstream. In the case where the second hot water line is designed to be a single system line, a single hot water line to which opening and closing valves and shower discharge ports can be connected so that scales of piping and shower discharge are restricted, is utilized. On the contrary, the hot water system line and the disposal water system line can be advantageously simplified. Furthermore, the replacement of disposal water in the second hot water line with hot water can be positively carried out similarly to the arrangement wherein the second hot water line is branched as described above.

In the shower apparatus A of the present embodiment, the disposal water construction and disposal water system are provided on the first, second and third hot water lines 2, 7, 9a and 9b but according to the essence of the present invention, the disposal water construction and disposal water system similar to those as described above may be provided only for the first and second hot water lines 2 and 7. The thus constructed shower apparatus has exactly similar effect to that of the first and second hot water lines 2 and 7 provided for the shower apparatus A according to the present embodiment.

For example, in the above-described first embodiment, the disposal water construction of the water removal system is provided also on the third hot water lines 9a and 9b in order not to discharge a small quantity of residual hot water remaining in the third hot water lines 9a and 9b. However, in the case where no problem involves in the residual hot water present in the electromagnetic valves 8a and 8b onward, such as in the cases where the third hot water lines 9a and 9b are relatively short, where the shower discharge ports $a_1$-1 and $a_6$-2 are directly connected to the electromagnetic valves 8a and 8b, or where piping is provided so that hot water is not remaining in the third hot water lines 9a and 9b, it is not necessary to provide a water disposal structure for the remaining hot water subsequent to the electromagnetic valves 8a, 8b and it is possible for only the disposal water construction and disposal water system of the first and second hot water lines 2 and 7 to immediately discharge hot water having an optimum temperature without being mixed with low temperature water from the shower discharge ports $a_1$-1 and $a_6$-2.

Moreover, a disposal water stop device may be added to first disposal water device of the shower apparatus A in which the disposal water construction and disposal water system are provided on the first and second hot water lines 2 and 7 as described above. According to this, in the case where the hot water in the first hot water line 2 is not at a predetermined temperature due to the defective operation of the hot water supply unit 1a, which is similar to the shower apparatus according to the present embodiment, it is possible to stop disposal of water from the drain valve 4.

As previously mentioned, with the shower apparatus A of the present embodiment, it is possible to use any one of the showers $a_1$ to $a_6$, and to use two switches out of the discharge operating switches $b_1$-1 to $b_6$-3, that are simultaneously depressed in a combination with the overhead showers $b_1$-1 to $b_1$-3 and the body showers $b_4$-1 to $b_4$-2, the hand shower $b_5$ and body shower $b_4$-1 to $b_4$-2, and the undershowers $b_6$-1 to $b_6$-3 and overhead showers $b_1$-1 to $b_6$-3 causing simultaneous discharge of hot water from one of the showers $a_1$, $a_5$ that are supplied with hot water from the branch line $7a$ side and the showers $a_4$, $a_6$ that are supplied with hot water from the branch line $7b$ side.

The left and right discharge ports $a_6$-1 and $a_6$-2 of the undershower $a_6$ can be simultaneously or separately discharged, and the left and right discharge ports $a_3$-1 and $a_3$-2, for disposing hot water, can be alternately or simultaneously discharged. For example, when an user depresses the discharge operating switch $b_1$-1 of the overhead shower $a_1$, the electromagnetic valve $8a$ of the spray discharge port $a_1$-1 in the overhead shower $a_1$ is opened, so that hot water having the optimum temperature within the branch line $7a$ is discharged in the form of spray from the spray discharge port $a_1$-1, and at the same time, a preset value of 15 l/min. is displayed on the discharge quantity, display section $62a$.

The control section 50 has one aspect shown in FIG. 4(B) in addition to that shown in FIG. 4(A). This comprises a discharge quantity setting means 70 and a flow rate adjusting means 71, which are arranged in parallel with the disposal water control means 58, 59 and 60 in a part of the memory circuit.

The aforesaid preset value is the optimum discharge quantity set corresponding to individual shower discharge ports $a_1$-1 to $a_6$-2 by the discharge quantity setting means 70 in the control section 50. In the case of the shower apparatus A according to the present embodiment, the discharge quantitites are preset to values shown in the following Table. The preset values are normally changed but the discharge quantities from the shower discharge ports $a_1$-1 and $a_6$-2 can be changed in set value by depressing the + and − buttons $61a$, and $61b$ in the range allowed by the discharge function, and in the range of 2 to 5 l/min. in the present embodiment.

TABLE

| Shower | | Preset value |
| --- | --- | --- |
| Overhead | Spray | 15 l/min |
| shower | Massage | 17 l/min |
| | Foam | 18 l/min |
| Mist shower | | 7 l/min |
| Exposing hot water | | 18 l/min |
| Body | Spray | 20 l/min |
| shower | Massage | 18 l/min |
| Under shower | | 8 l/min |
| Hand shower | | 12 l/min |

For example, when the discharge operating switch $b_1$-1 of the spray discharge in the overhead shower $a_1$ is depressed, the discharge starts and at the same time, the preset value of 15 l/min. is displayed on the discharge quantity display section $62a$. In that state, flow rate adjusting mechanism 71 of the control section 50, from the spray discharge port $a_1$-1, functions as will be described later, whereby hot water having an optimum temperature in a quantity of 15 l/min. is discharged in the form of spray. When the user depresses the + button $61a$ to change it to 18 l/min., the discharge quantity setting mechanism 70 sets the value of the discharge quantity corresponding to the spray discharge port $a_1$-1 of the overhead shower to 18 l/min.

The discharge quantity setting mechanism 70 also controls the set values of discharge quantities corresponding to other shower discharge ports $a_1$-2 to $a_6$-2 similar to the aforesaid spray discharge port $a_1$-1. The discharge operating switches $b_1$-1 to $b_6$-3, corresponding to the shower discharge port as desired, are depressed to start the shower discharge. From that state, the + and − buttons $61a'$ and $61b$ are depressed. The set values of the discharge quantities corresponding to the shower discharge ports $a_1$-1 to $a_6$-2 can be changed in setting within the predetermined range with the respective preset values as a reference.

On the other hand, the flow rate adjusting means 71 of the control section 60 opens one or two electromagnetic valves $8a$ and $8b$, corresponding to the shower discharge ports $a_1$-1 to $a_6$-2, at the time of independent discharge or simultaneous discharge, and always monitors the discharge quantities from the shower discharge ports $a_1$-1 to $a_6$-2, according to water quantity detection information supplied from the water quantity sensors $14a$ and $14b$ of both branch lines $7a$ and $7b$. The control section 50 compares the water quantity value, that is, the discharge quantity from the shower discharge ports $a_1$-1 to $a_6$-2 through both branch lines $7a$ and $7b$, with the discharge quantity set values of the shower discharge ports $a_1$-1 to $a_6$-2 set by the discharge quantity setting mechanisms 70. The opening degree of the flow rate adjusting valves $13a$ and $13b$ is controlled according to a difference therebetween to thereby realize the discharge matched to the set values from the shower discharge ports $a_1$-1 to $a_6$-2.

In actual use, when the + and − buttons $61a$, and $61b$ are depressed, the aforementioned step is instantaneously executed and, the discharge in the desired water quantity is immediately executed from the shower discharge ports $a_1$-1 to $a_6$-2 used.

As described above, both flow rate adjusting valves $13a$ and $13b$ in both branch lines $7a$ and $7b$ are independently controlled in opening degree by the control section 50. Accordingly, for example, in the case where the discharge from the massage discharge port $a_1$-2 of the overhead shower $a_1$ on the branch line $7a$ side and that from the spray discharge port $a_4$-1 of the body shower $a_4$ on the branch line $7b$ side are simultaneously carried out, the flow rate adjusting valves $13a$ and $13b$ of both branch lines $7a$ and $7b$ are separately controlled by the flow rate adjusting mechanism 71 whereby discharges for preset values 17 l/min. and 20 l/min., set to both the discharge ports $a_1$-2 and $a_4$-1, are carried out therefrom. Discharges in the optimum discharge quantity are carried out from the shower discharge ports $a_1$-2 and $a_4$-1 which are different in function from each other.

In the case where the discharge quantities from both the discharge ports $a_1$-2 and $a_4$-1 are desired to be changed from the respective preset values according to the user's preference, the + and − buttons $61a$, and $61b$, are depressed to vary the set values of the discharge quantities with respect to both the discharge ports $a_1$-2 and $a_4$-1, whereby the discharge quantities from both the discharge ports $a_1$-2 and $a_4$-1 can be separately adjusted.

In the case where the setting of the discharge quantities with respect to the shower discharge ports $a_1$-1 to $a_6$-2 is changed from the preset value set at the outset, the thus changed set value may be controlled so that it is reset after a predetermined time, for example, after three minutes and returned to the original preset value or the set value is reset when the power source is OFF and returned to the preset value at the time of next use. Furthermore, it is so designed that the preset value itself is not set but the set values of the discharge quantities with respect to each of the shower discharge ports $a_1$-1 and $a_6$-2 set by the + and − buttons 61a, 61b are effective till next change of setting is performed.

In the shower apparatus A according to the present embodiment constructed as described above, water is simultaneously discharged from the shower discharge ports $a_1$-1 to $a_6$-2, which are communicated with both the branch lines 7a and 7b. The operation for adjusting the discharge quantities from these shower discharge ports to the optimum discharge quantity for every individual discharge port can be carried out easily and instantaneously by a push button operation from the operating panel $a_7$. Particularly, synergetic effect resulting from the simultaneous discharge of various kinds of showers $a_1$ to $a_6$ is great.

Combining and switching operations of discharges to be effected from the shower discharge ports $a_1$-1 and $a_6$-2 can be manually carried out from the operating panel $a_7$ by the user. However, in the present embodiment, several kinds of discharge programs are incorporated in advance into the control section 50 as will be described later and the automatic mode switches 67a, 67b and 67c on the operating panel $a_7$ are selected for execution. Thereby, the discharges from the showers $a_1$ to $a_6$ are connected as intended, and effective shower bath can be easily enjoyed.

In case that water discharging is carried out by changing over each of the shower discharging ports $a_1$-1 to $a_6$-6 by depressing automatic mode switches 67a, 67b and 67c in sequence, the amount of discharged water corresponding to each of the preset values is discharged from each of the shower discharging ports $a_1$-1 to $a_6$-2. However, the control section 50 may act in the same manner, as described above, even during an automatic operation mode, so that a discharge quantity from each of the shower discharging ports $a_1$-1 to $a_6$-2, performing the discharging operation, is displayed at the discharge quantity displaying sections 62a and 62b. Depressing the + and − buttons 61a and 61b enables the discharge quantity from the shower discharging ports $a_1$-1 to $a_6$-2, performing the operation, to be varied in the same manner as that of the manual operation.

Figure 4C:
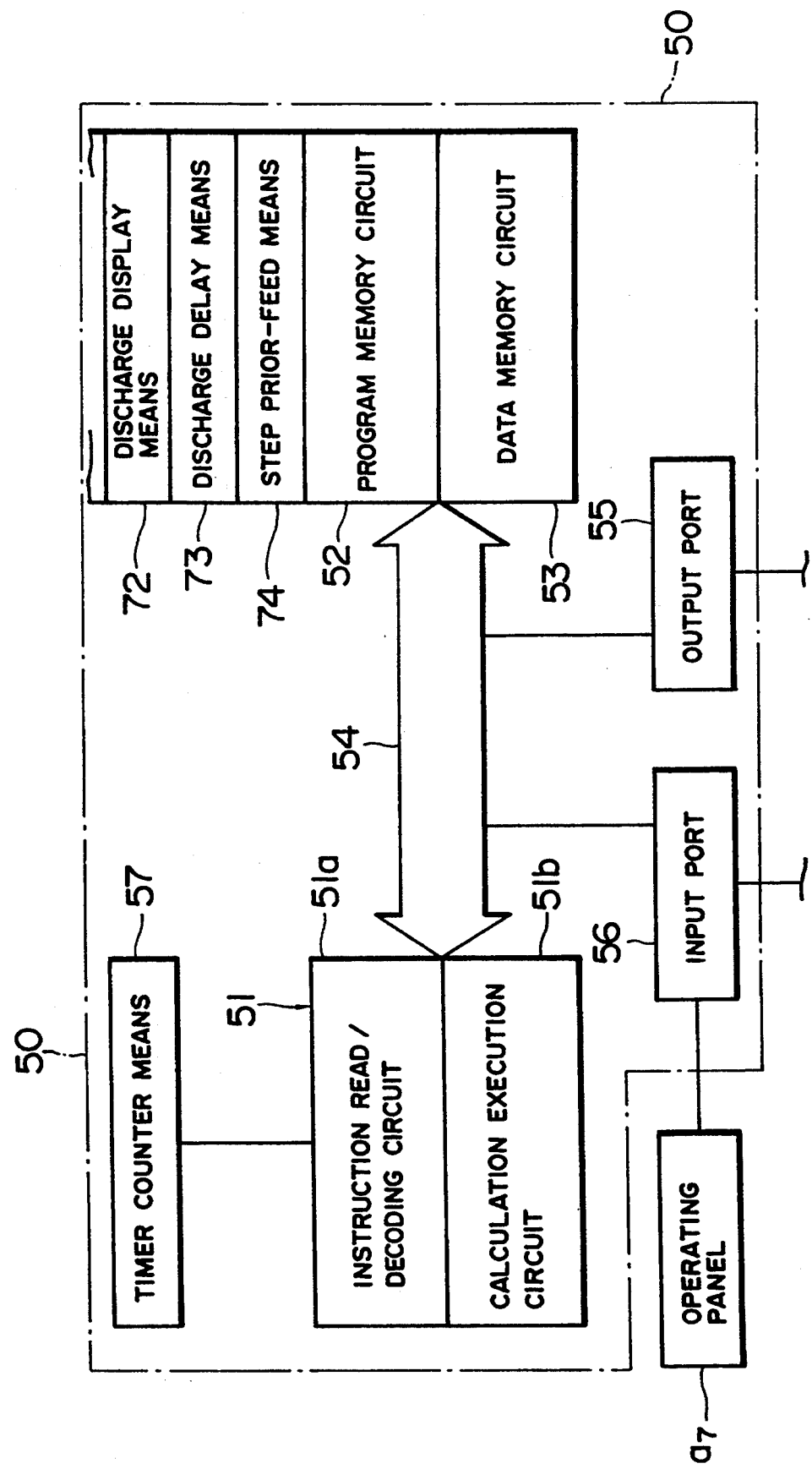

FIG. 4(C) is a block diagram showing another aspect of the control section 50, in which a discharge display device 72, a discharge delay device 73 and a step prior-feed device 74 are provided parallel with a mechanism such as the disposal water control mechanism and the like. As will be apparent from FIG. 4(C), the control section 50 comprises the discharge display device 72 for successively displaying the programmed discharge content on the display section at every start of a step of the program. The discharge delay device 73 provides a predetermined discharge inhibition time t from the start of each step to the start of opening the electromagnetic valves 8a and 8b program set in the step according to a signal input from the operating section 67 on the operating panel $a_7$. The step prior-feed device 74 discontinues the step by which program is executed to stop the discharge, according to a signal input from the operating section 67 during the automatic control operation which includes the discharge inhibition time t and switching the step to next step to be shifted for the next discharge order.

A display section D is a light emitting body, for example, such as LED, which is electrically communicated with an operation signal converter 61 of the control section 50 disposed in front of the shower tower A' and at a position where a user can see it easily. The display section D comprises discharge position display lamps $D_1$ . . . provided corresponding to the discharge ports $a_1$-1 to $a_6$-2 in the schematic view of the whole shower tower A', shower-kind display lamps $D_2$ . . . provided corresponding to the shower discharge ports $a_1$-1 to $a_6$-2 on picture letters showing the kinds and function of showers, discharge-quantity display sections 62a, 62b showing instantaneous flow rate preset in program of discharges which can be adjusted by the adjusting buttons 61a, 61b, and a residual time display surface $D_3$ showing residual time until the termination of a program during the automatic control while subtracting as the program executes.

That is, the discharge display device 72 reads, every time when a signal is outputted from the operating section 67 to the control section 50 to start the step of program. The electromagnetic valves 8a and 8b are expected to be opened from the program in the step to light some of the discharge position display lamps $D_1$ and shower-kind display lamps $D_2$ corresponding to the shower discharge ports $a_1$-1–$a_6$-2. The discharge display device reads the instantaneous discharge quantity to display it on the discharge quantity, display sections 62a and 62b, and reads the residual time until termination of the opening of the electromagnetic valves 8a and 8b in the last program to display it on the time display surface $D_3$, and reduces it by a predetermined unit after the passage of time.

The discharge delay device 73 starts, every time a signal is outputted from the operating section 67 the control section 50 to start the programmed step. The discharge inhibition time t, for example, is about two seconds. The valves 8a and 8b are opened in this step. Upon termination of the discharge inhibition time t, the electromagnetic valves 8a and 8b are opened.

The step prior-feed mechanism 74 discontinues, operation during the automatic control, more specifically, every time when a signal is outputted from the operating section 67 to the control section 50 during the discharge inhibition time t which is the step by which the program is executed. As such the execution of the program with the electromagnetic valves 8a and 8b are forcibly switched to to start the next step. In the case where a signal is outputted from the operating section 67 to the control section 50 when the valves 8a and 8b are opened, after the passage of the discharge inhibition time t. The step presently executed is discontinued closing the electromagnetic valves 8a and 8b now opened. The execution of the program is forcibly switched to the next step to start the execution of the next step.

In the case of the present embodiment, three kinds of programs differ in the order of opening and closing operation. The opening time or the like of the electromagnetic valves 8a and 8b is stored in the program memory circuit 52. Automatic mode switches 67a, 67b and 67c and three selection display lamps $D_5$, which are close to the automatic mode switches 67a, 67b and 67c, are provided on the operating section 67 so that one of the automatic mode switches 67a, 67b and 67c is selected and touched (depressed) whereby only the program corresponding thereto is read in central processing unit 51. The step prior-feed mechanism 74 is actuated in response to the input signal only when one of the same automatic mode switches 67a, 67b and 67c as that selected previously, is again depressed during the automatic control operation. The step prior-feed mechanism is actuated in response to the input signal whereas one of the automatic mode switches 67a, 67b and 67c differ from that previously selected is depressed. The program now being executed is released and switched to the latter program.

In case of the present embodiment, an alarm sound generating section C, for example, such as a buzzer, which is operatively connected to the discharge position display lamps $D_1$... and shower-kind display lamps $D_2$... of the display section D electrically communicated with the operation signal converter 61 of the control section 50, is disposed interiorly of the shower tower A'. When each step reaches a predetermined time for switching as the program executes, one or more discharge position display lamps $D_1$ and shower-kind display lamps $D_2$ are expected to discharge in the next step causing a flicker. At the same time, the alarm sound generating section C is actuated transmitting an alarm sound such as a buzzer for 0.2 second at one second intervals, for example.

Next, the operation of the aforesaid discharge display mechanism 72, the discharge delay mechanism 73 and the step prior-feed mechanism 74 will be described hereinafter.

When one of the automatic mode switches 67a, 67b and 67c on the operating panel $a_7$ is depressed, the selection display lamp $D_5$, on the display section D, close thereto, is lit. The first step of program corresponding thereto is started whereby the discharge position display lamp $D_1$ and shower-type display lamp $D_2$ on the display section D, corresponding to the electromagnetic valve I expected to be opened in the first step, are lit. The instantaneous discharge quantity is displayed on the discharge quantity display sections 62a and 62b, and the residual time until the termination of the step is displayed on the residual time display surface $D_3$. Simultaneously therewith, the discharge inhibition time t is started by the discharge delay means 73 and the valve I remains closed.

If in that state, the user does not depress any of the automatic mode switches 67a, 67b and 67c during the discharge inhibition time t, the electromagnetic valve I is opened in the first step after the passage of the discharge inhibition time (t) as shown in the time chart of FIG. 9A, so that hot water or cold water supplied from the hot water and cold water mixing cock 3 is discharged from the programmed first shower discharge ports $a_1$-1-$a_6$-2 in a small quantity at first and in a programmed instantaneous quantity after the passage of a predetermined time.

Before a predetermined time at which a preset valve-opening time $T_1$ is terminated from the start of the valve-opening, the discharge position display lamp $D_1$ and shower-kind display lamp $D_2$, corresponding to the electromagnetic valve II, are expected to be opened in the next step during the discharge at present flicker. At the same time, an alarm sound goes to notify the user of the next discharge, after which when the opening time $T_1$ has passed and the step is switched to the next step, the electromagnetic valve I is closed to stop the discharge. At the same time the flickering discharge position display lamp $D_1$ and shower-type display lamp $D_2$ are lit. Then, the electromagnetic valve II is opened to start the discharge. Further, the display of the discharge quantity display sections 62a and 62b is switched and the display of the residual time display surface $D_1$ is also reduced as the time passes.

After the passage of the opening time $T_2$ of the electromagnetic valve II as described above, the step is switched to the final step, and the electromagnetic valve II is closed and at the same time the electromagnetic valve III is opened. After the passage of the opening time T, the program is terminated and the display on the residual time display surface $D_3$ is 0.

After the passage of $t_1$, but before the discharge inhibition time t in the first step passes, the user looks at the lit discharge position display lamp $D_1$ and the shower-type display lamp $D_2$ and again depresses the automatic mode switches 67a, 67b and 67c for the lit display lamp $D_1$ selected according to the physical condition and the individual preference. Then the step is switched to the next step with water not discharged at the time before the electromagnetic valve I is opened as shown in the time chart of FIG. 9B, by the step prior-feed mechanism 74, and executed. With this, the discharge position display lamp $D_1$ and shower-kind display lamp $D_2$ corresponding to the electromagnetic valve II, expected to be opened in the next step, are lit. The display of the discharge quantity display sections 62a, 62b and the residual time display surface $D_4$ are switched and at the same time the discharge inhibition time t newly starts.

If the same automatic mode switches 67a, 67b and 67c are again likewise operated after the elapsing of $t_2$ of the discharge inhibition time t, the step is switched to the next step at the time before the electromagnetic valve II is opened as described above. The display section D corresponding to the electromagnetic valve III is switched. At the same time, the discharge inhibition time t starts, and if it is not again operated until the discharge inhibition time t has passed, the electromagnetic valve III is opened to start discharge. After the passage of the opening time $T_3$, the program is terminated.

Accordingly, if the operation is repeated during the discharge inhibition time t, the whole programmed discharge content is displayed without water being discharged.

Figure 9C:
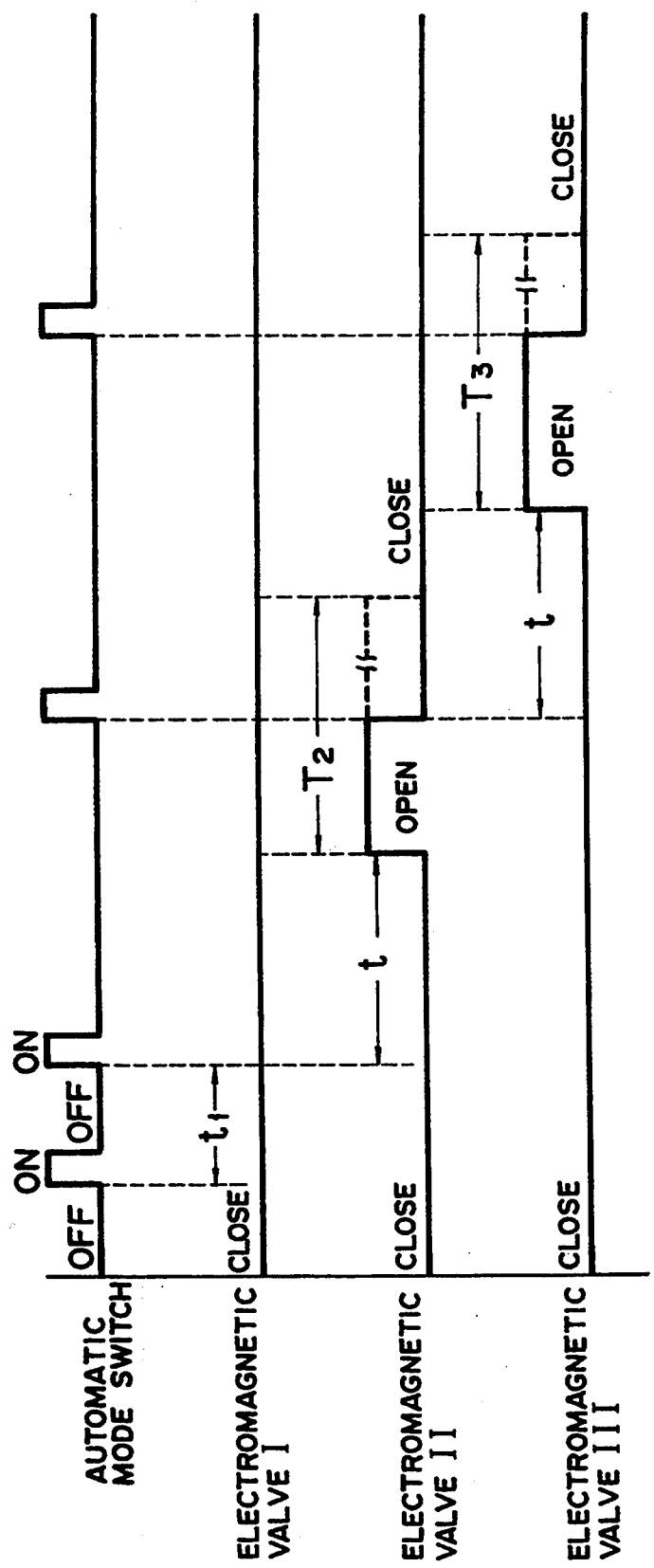

Furthermore, in the state where the electromagnetic valve II is opened as shown in the time chart of FIG. 9(C), for example, similar operation is made at the time before the opening time $T_2$ has passed. Then, the electromagnetic valve II is closed at that time so that the discharge is stopped and at the same time the charge inhibition time t starts. In the state where the electromagnetic valve III is opened, similar operation is made at the time before the opening time $T_3$ has passed. Then, the valve III is closed to terminate the program. Accordingly, the program is terminated soon every operation of the same automatic mode switches 67a, 67b and 67c, and the residual time displayed on the residual time display surface $D_3$ becomes short. The foresaid pattern of the discharged water under operation of each of the automatic mode switches 67a, 67b and 67c is not limited to the above, but the shower type, and water discharging time can be freely combined.

While in the previously illustrated embodiment, a plurality of shower discharge ports $a_1$-1 to $a_6$-2, which are different in function, are provided on the shower tower body A' to automatically successively discharge hot water or cold water in response to the program. It is to be noted that the same is true for the case where hot water or cold water is successively automatically discharged out of the shower discharge ports having the same function and different position.

Moreover, the discharge content displayed on the display section D is not limited to that as described above but suitable contents may be displayed thereon. Furthermore, the alarm sound generating section C may not be provided.

According to the above-described embodiment, a signal is outputted from the operating section 67 to the control section 50 to execute the program whereby at the start of each step, the discharge display mechanism 72 displays the discharge content of that step on the display section D and the discharge delay mechanism 73 starts the discharge inhibition time t. Every time the signal is again inputted from the operating section 67 during the discharge inhibition time t, the step prior-feed device 74 switches the step to the next step. With this, the discharge content of the next step is displayed on the display section D to newly start the discharge inhibition time t. The electromagnetic valves 8a and 8b, set in the step during the execution of the program, are opened only at the time when a signal is not inputted from the operating section 67 during the discharge inhibition time t. Therefore, the discharge content set in program during the automatic control can be converted.

Accordingly, as compared with the prior art in which the discharge contents such as the discharge order are fixed every preset program, the discharge order, the discharge time and the like can be suitably changed according to the user's physical condition, the individual taste or the like. The user's free operation can be made and the apparatus is easily used. Selection of programs, operation and the like is simpler than apparatus in which various programs are stored in a controller, rendering operation easy.

Furthermore, if steps are previously fed plural times by the operating section 67 during the discharge inhibition time t whereby a plurality of discharge contents differing in discharge position, discharge time and the like are displayed at the start of each step, the whole programmed discharge content is seen without being discharged. Therefore, the whole programmed discharge content can be displayed in a small exclusive area.

Figure 4D:
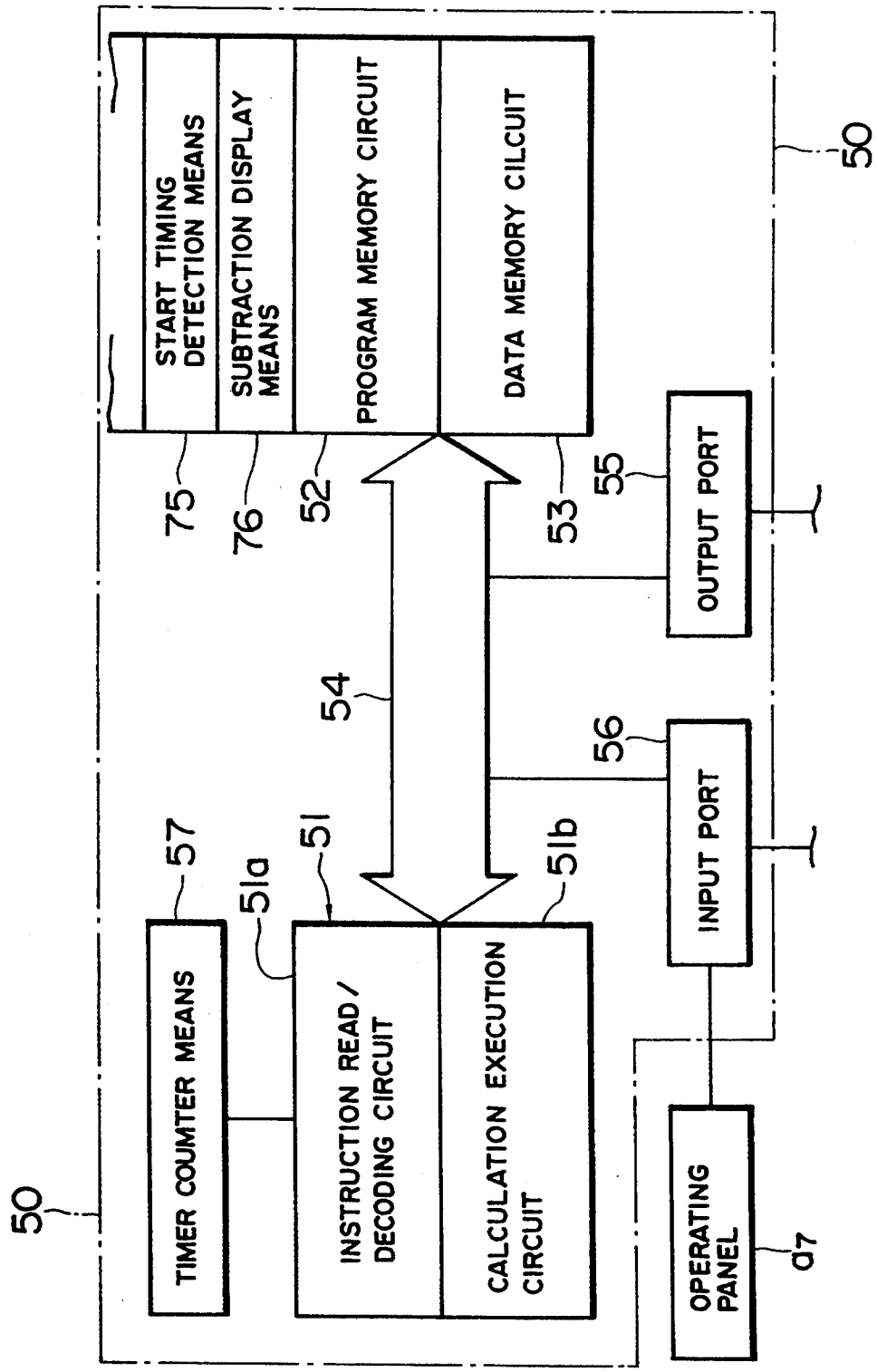

FIG. 4(D) is a block diagram showing another aspect of the control section 50. A start timing detection device 75 and a subtraction display device 76 are provided in parallel with other devices such as the disposal water control device 58, 59, 60, etc.

As will be apparent from FIG. 4D, the control section 50 comprises the start timing detection device 75 for detecting the time at which automatic control is started by a signal from the operating section 67. The subtraction display device 76 displays the display time of the programmed automatic control on the basis of the detection signal outputted from the start timing detection device 75 on the residual time display surface $D_3$ disposed at a position easily seen by the user of the shower tower body A', to subtract the display time as the disply time passes every unit.

That is, the start timing detection device 75, when an automatic control start signal is outputted from the operating section 67 to the controller 50, detecting the time at which the first programmed electromagnetic valves 8a and 8b are opened, outputs a detection signal to the subtraction display device 76. When inputting the detection signal, the subtraction display device 76 first reads the opening time from the start of the opening of the first programmed electromagnetic valves 8a and 8b to closing of the final programmed valves 8a and 8b, to total the time, which is displayed in numeral on the reading time display surface $D_3$. At the same time, the timer counter device 57 is operated so that displayed time $d_1$, for example, in units of seconds, is subtracted in synchronism with the count of the timer counter device 57, and at the closing of the programmed final electromagnetic valves 8a and 8b, displayed time $d_1$ is 0.

Next, the operation of the aforesaid start timing detection device 75 and subtraction device 76 will be described.

When any one of the automatic mode switches 67a, 67b and 67c on the operating panel $a_7$ is depressed, the electromagnetic valves 8a and 8b are successively opened in response to the program corresponding thereto so that hot water or cold water supplied from the hot water and cold water mixing cock 3 is discharged in a programmed instantaneous quantity from the programmed first shower discharge ports $a_1$-1 to $a_6$-2. At the same time, the start timing detection device 75 detects an automatic control start signal to output a detection signal to the subtraction display device 76. With this, the subtraction display device 76 displays the residual time $d_1$ until the program is terminated on the residual time display surface $D_3$ and subtracts the residual time $d_3$ by a predetermined unit with the passage of the discharge time. At the time of termination of discharge from the programmed final shower discharge ports $a_1$-1 to $a_6$-2, the residual time $d_3$ is 0. Accordingly, the user can see the residual time $d_3$ to finish washing his or her body or head until termination of the discharge.

While in the above-illustrated embodiment, a plurality of shower discharge ports $a_1$-1 to $a_6$-2 differing in fuction, are provided on the shower tower body A' and programmed hot water or cold water are successively automatically discharged by the operation of the operating section 67, it is to be noted that the same is true for the case where the automatic control is started by those other than the operating section 67, and in the case where shower discharge ports having the same function and different in position of arrangement are successively automatically discharged.

Furthermore, while in the above-described embodiment, the residual time $d_3$ until one program is terminated is displayed on the residual time display surface $D_3$, it is to be noted that, for example, residual time of the electromagnetic valves 8a and 8b, which are successively opened and closed according to the programs, may be displayed one by one. It is contemplated that the residual time $d_3$ until one program is terminated is displayed together therewith.

According to the above-described embodiment, the start timing detection device 75 detects an automatic-control start time of the control section to output a detection signal whereby the subtraction display means 76 displays the discharge time of the programmed automatic control on the residual time display surface $D_3$. The display is reduced by a predetermined unit as the residual time $d_3$ passes, and the display is 0 at the time of termination of the automatic control. Therefore, the user can be notified of the discharge residual time $d_3$ during the automatic control discharge.

Accordingly, as compared with the prior art which is not provided with means for notifying the user of the residual time $d_3$ until the discharge is terminated, during the automatic control discharge, the user can see the display of the discharge to find the residual time $d_3$ during the present discharge to finish washing his or her body or head before the discharge is terminated. It is not necessary to re-operate the system to render the use thereof easy.

Figure 4E:
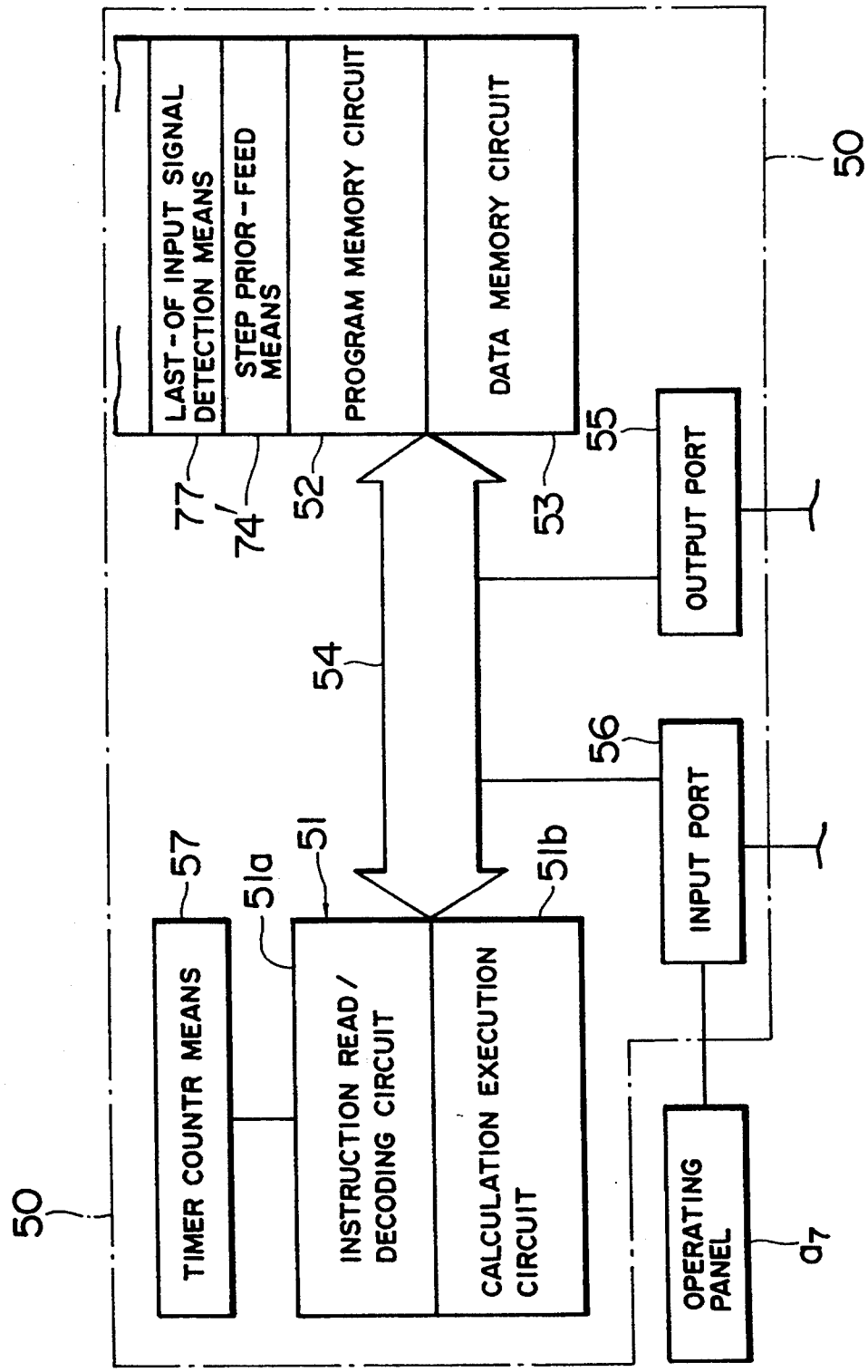
Figure 4F:
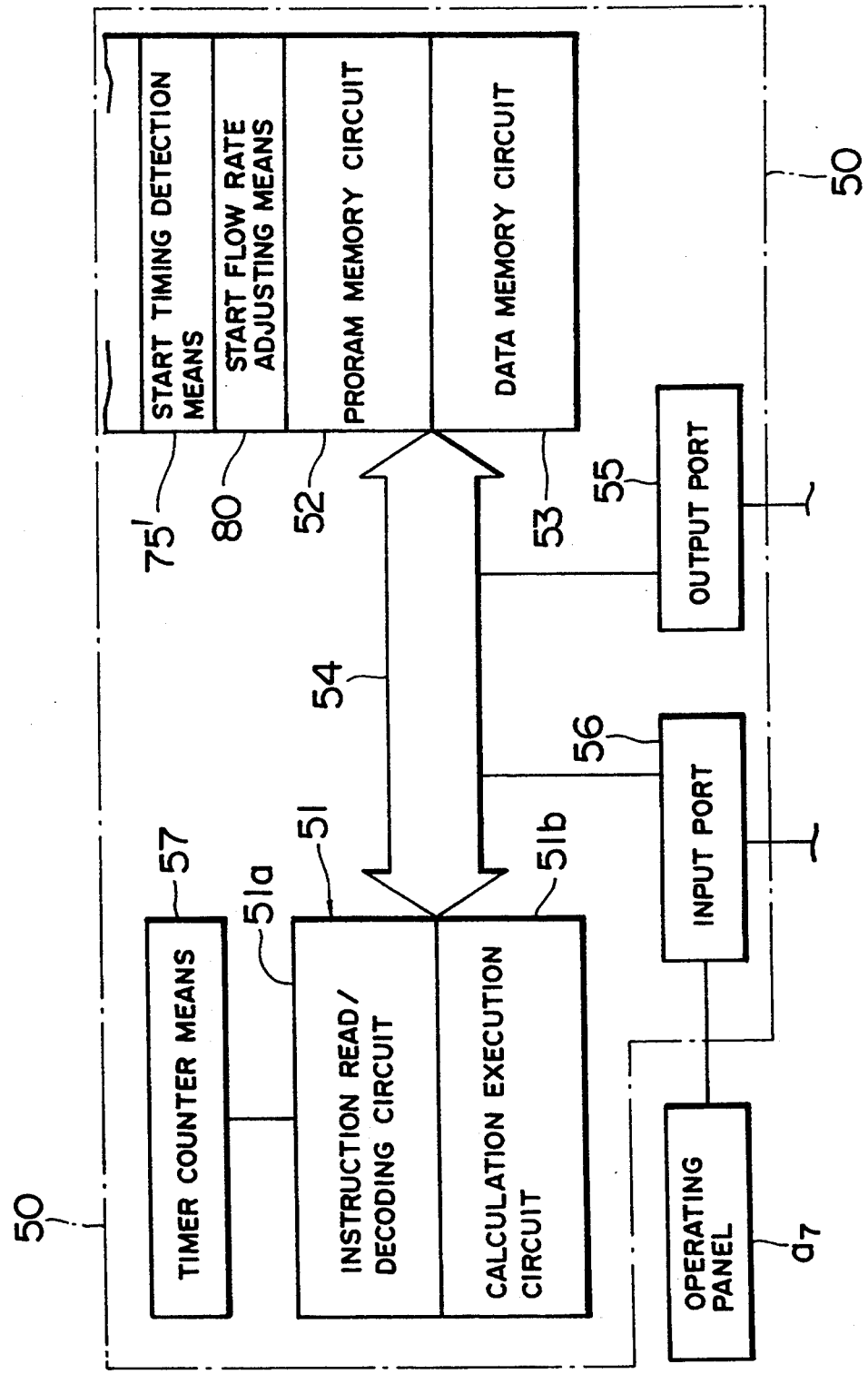

FIG. 4(E) is a block diagram showing another aspect of the control section 50. A last-off input signal detection device 77 and a step prior-feed device 78 are shown provided in a part of the memory circuit. As described above, the control section 50 comprises the last-off input signal detection device 77 for detecting a signal input from the operating section 67 during the time the electromagnetic valves 8a and 8b are successively opened and closed with the execution of the steps of the programs. The step prior-feed device 78 is provided for discontinuing the step of the programs now being executed on the basis of the detection signal outputted from the last-off input signal detection device 77 stopping discharge and switching the step to the next step of the next discharge order.

When any one of the automatic mode switches 67a, 67b and 67c on the operating panel a7 is selected and depressed in the operating panel, only the program according thereto is read into the central processing unit 51 and only when the same automatic mode switches 67a, 67b and 67c as those selected previously are again depressed during the automatic control operation. The last-off input signal detection device 77 detects an input signal. In the case where the automatic mode switches 67a, 67b and 67c, differing from that previously selected, is depressed, the program now being executed is released switching the program into the latter program.

That is, when the last-off input signal detection device 77 stores therein a signal inputted from any one of the automatic mode switches 67a, 67b and 67c on the operating panel a7 in the initial state, it detects that the same signal, as the stored input signal, is inputted from the automatic mode switches 67a, 67b and 67c during the automatic control discharge started. A detection signal is outputted to the step prior-feed device 74'. When the detection signal is inputted, the step prior-feed device 74' first discontinues the step now being executed to close the opened electromagnetic valves 8a and 8b. This stops discharge and forcibly switches the execution of the step to the next step whereby the electromagnetic valves 8a and 8b, set in program to the next step, are opened to start discharge. Thereafter, the automatic control discharge is successively accomplished according to the programs.

The operation of the shower apparatus will be described hereinafter.

If any one of the automatic mode switches 67a, 67b and 67c on the operating panel a7 is selected and depressed, the selected display lamp $D_5$ of the display section D closest thereto is lit. The electromagnetic valve I, set to the first step of the program corresponding thereto, is opened so that hot water or cold water supplied from the hot water and cold water is discharged from the programmed first shower discharge ports $a_1$-1-$a_6$-2 in a small quantity at first and in a programmed instantaneous quantity after passage of a predetermined time. At the same time the discharge position display lamp $D_1$ and shower-type display lamp $D_2$ of the display section D are lit corresponding to the aforesaid discharge. The residual time until the program is terminated is displayed on the residual display surface $D_3$ and the instantaneous flow rate not being discharged is displayed on the discharge quantity display sections 62a and 62b.

Thereafter, before a predetermined time at which the step is switched from the initial step to the next step, the discharge position display lamp $D_1$ and shower-kind display lamp $D_2$, corresponding to the shower discharge ports $a_1$-1 to $a_6$-2 that are expected to be discharged in the next step being now discharged, flicker and at the same time, an alarm sound goes gives a user notice of the next discharge.

Figure 10A:
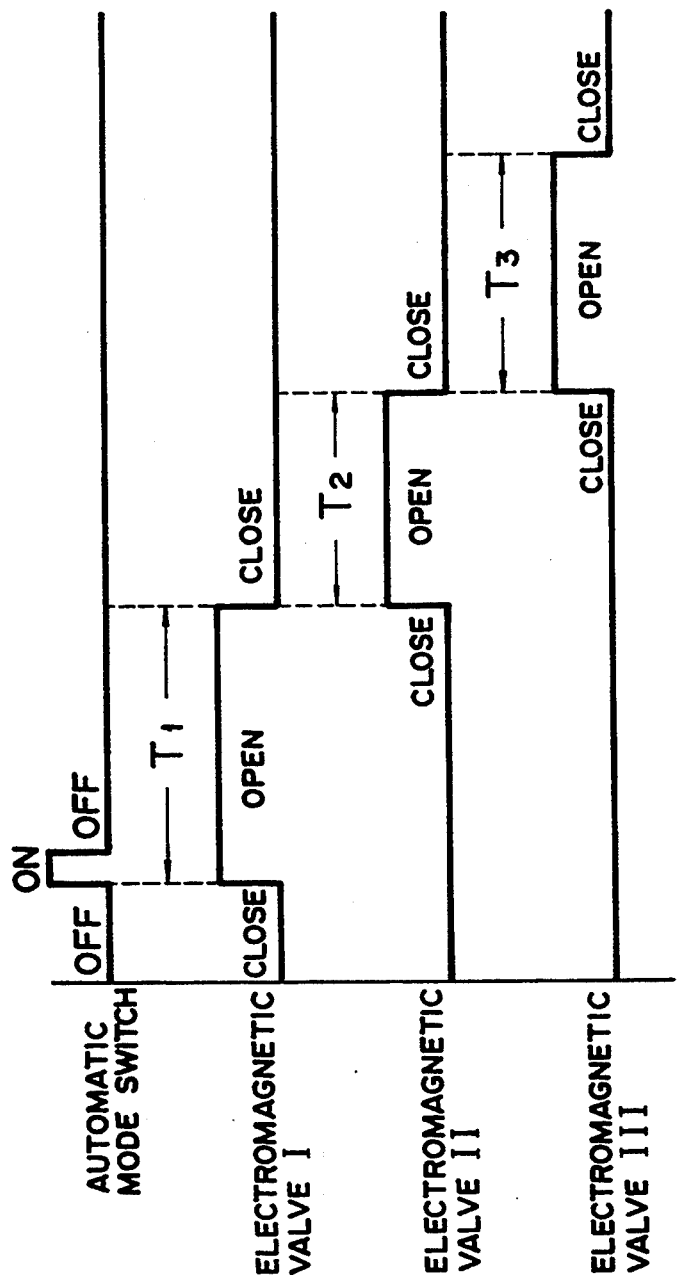
FIG. 10(A) is a time chart in case the step is not previously fed.

In that state, if the user does not depress any of the automatic mode switches 67a, 67b and 67c, the electromagnetic valve I, in the first step, remains open until a predetermined opening time $T_1$ is terminated, according to the program as shown in the time chart of FIG. 10A. At the same time the valve I is closed, the electromagnetic valve II in the next step opens. After passage of the opening time $T_2$, the electromagnetic valve III in the final step opens, and after the passage of the opening time $T_3$, the program is terminated.

Figure 10B:
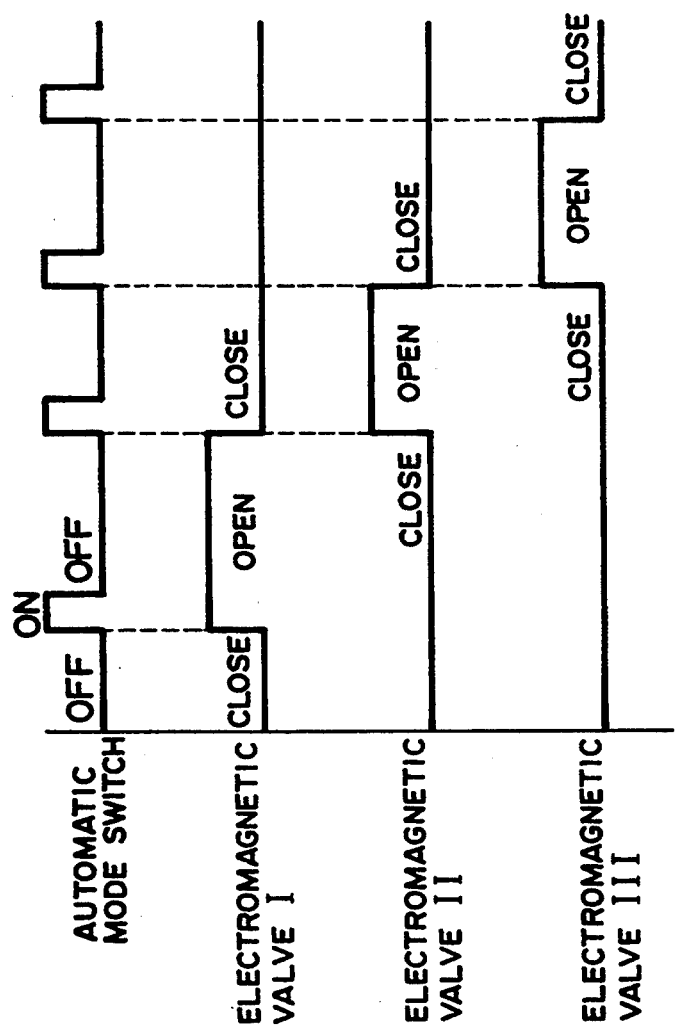
FIG. 10(B) is a time chart in case the step is previously fed.

When any one of the automatic mode switches 67a, 67b and 67c for which the selected display lamp $D_5$ is lit, according to the user's physical condition or individual taste, is again depressed during the time the user sees a notice of the next discharge or during the time before the user sees a notice of the next discharge, the valve is closed before the opening time $T_1$ of the electromagnetic valve I is terminated as shown in the time chart of FIG. 10(B) by the last-off signal detection device 17 and the step prior-feed device 74' thus stopping discharge. The electromagnetic valve II in the next step is opened to start discharge.

Thereafter, when automatic mode switches 67a, 67b and 67c are depressed again before the opening time $T_2$ of the electromagnetic valve II is terminated, the valve II is closed at that time whereas the valve III is opened. When a similar operation is made before the opening time $T_1$ of the electromagnetic valve III is terminated, the electromagnetic valve III is closed to terminate the program.

Whenever the same automatic mode switches 67a, 67b and 67c are operated, the termination of program is quickened, and the residual time displayed on the residual time display surface $D_3$ is shortened.

According to the embodiment as described above, the last-off input signal detection means 77 detects an input signal from the operating section to output the detection signal while the electromagnetic valves 8a and 8b are successively opened and closed on the basis of the steps of the programs. The step prior-feed means 78 discontinues the step of the program now being executed. The step is switched to the next step for the next discharge order so that the termination of the program is quickened, and therefore, the discharge order and the discharge time can be changed during the automatic control discharge.

FIG. 4(F) is a block diagram showing another aspect of the control section 50. A start timing detection device 75' and a start flow rate adjusting device 80 are shown provided in a part of the memory circuit.

As described above, the control section 50 comprises the start timing detection device 75' for detecting the time at which the automatic control is started by a signal from the operating section 67 of the operating panel a7. The start flow rate adjusting device 80 is provided for throttling an opening degree of the flow rate adjusting valves 13a and 13b, positioned upstream of the programmed first shower discharge ports $a_1$-1 to $a_6$-2, according to the detection signal outputted from the start timing detection device 75' and for loosening the opening degree of the flow rate adjusting valves 13a and 13b after a predetermined time to provide a programmed opening degree.

That is, when the automatic control start signal outputted from the operating section 67 to the control section 50, the start timing detection device 75′ outputs a detection signal to the start flow rate adjusting device 80. When the detection signal is inputted, the start flow rate adjusting device 80 first causes the timer counter device to throttle the opening degree of the flow rate adjusting valves 13a and 13b upstream of the programmed first discharge ports $a_1$-1–$a_6$-2. Substantially simultaneously therewith, the valves 8a and 8b, in communication with the programmed first shower discharge ports $a_1$-1 to $a_6$-2 are opened to discharge hot water or cold water to an extent that the hot water or cold water are exposed to the body of the user violently.

Figure 11A:
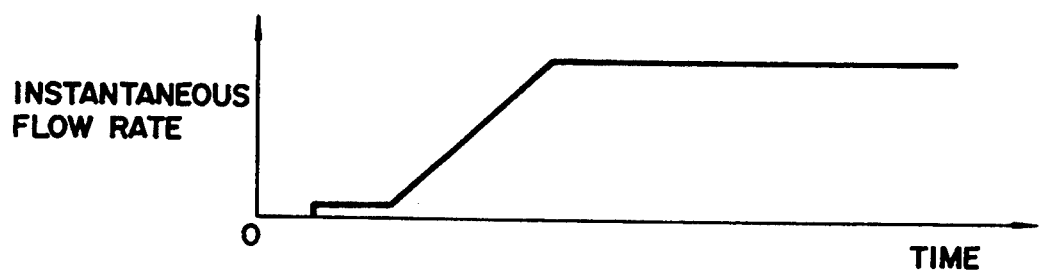
FIG. 11(A) is a graph showing the relationship between the instantaneous flow rate of hot water or cold water discharged out of initial shower discharge ports set in program and time.
Figure 11B:
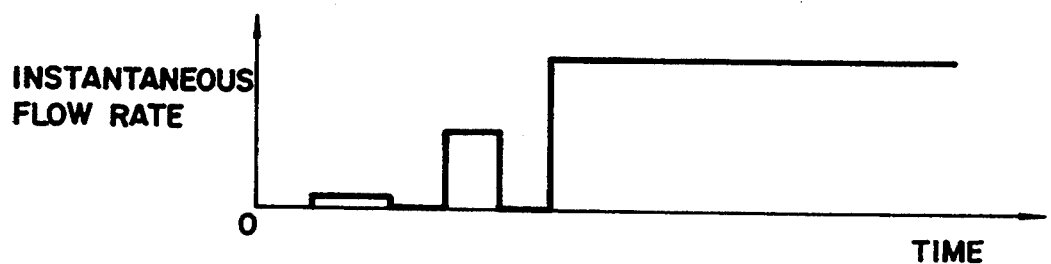
FIGS. 11(B) and FIG. 11(C) are graphs showing other examples.
Figure 11C:
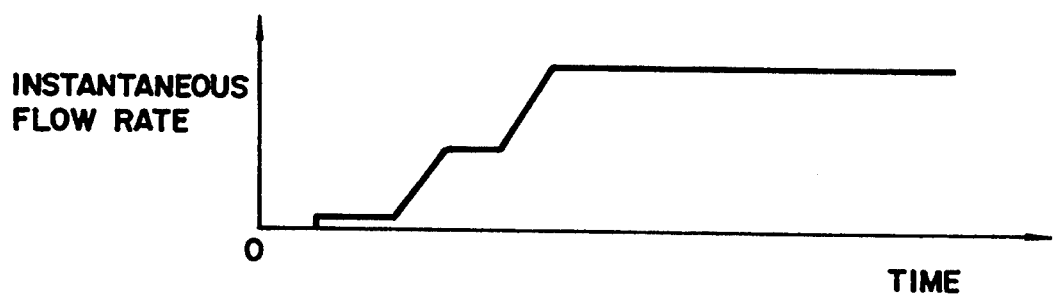

Thereafter, when the timer counter device 57 counts of a predetermined time from the start of discharge, the start flow rate adjusting device 80 gradually loosens the opening degree of the flow rate adjusting valves 13a and 13b as shown in FIG. 11(A), for example, to gradually increase the instantaneous flow rate of hot water or cold water discharged. When the opening degree of the valves 13a and 13b assumes the programmed opening degree, and the instantaneous flow rate assumes a set flow rate, the opening degree of the flow rate adjusting valves 13a and 13b is maintained, or the programmed first electromagnetic valves 8a and 8b are intermittently opened and closed while loosening the opening degree of the flow rate adjusting electromagnetic valves 8a and 8b as shown in FIG. 11(B). This stepwisely increases the instantaneous flow rate of the hot water or cold water except for the discharge stop time, or the opening degree of the flow rate adjusting valves 13a and 13b is intermittently loosened as shown in FIG. 11(C) so as to stepwisely increase the instantaneous flow rate.

The operation of the shower apparatus as described above will be described hereinafter.

When any one of the automatic mode switches 67a, 67b and 67c on the operating panel $a_7$ is depressed, the electromagnetic valves 8a an 8b are successively opened on the basis of the program corresponding thereto. The start timing detection device 75′ first detects an automatic control start signal to output a detection signal to the start flow rate adjusting device 80. With this, the start flow rate adjusting device 80 throttles an opening degree of the flow rate adjusting valves 13a and 13b to discharge hot water or cold water supplied from the hot water and cold water mixing cock 3 to an extent that the hot water or cold water is not violently exposed to the user from the programmed first shower discharge ports $a_1$-1 to $a_6$-2. After a predetermined time, the start flow rate adjusting device 80 loosens an opening degree of the flow rate adjusting valves 13a and 13b to thereby increase the instantaneous flow rate of hot water or cold water discharged to assume a programmed instantaneous flow rate.

According to the above-described embodiment, the start timing detection device 50 detects automatic control start timing of the control section 50 to output a detection signal whereby the start flow rate adjusting device 80 changes an opening degree of the flow rate adjusting valves 13a and 13b. Accordingly, hot water or cold water is discharged for a predetermined time in a less instantaneous flow rate from the programmed first shower discharge ports $a_1$ to $a_6$ and thereafter the instantaneous flow rate is increased closer to a programmed set flow rate to preventing a rapid discharge at the time of starting automatic control. Thereby, the user is relieved from a surprise and can use automatic control with easy.

The adjustment of flow rate at the start of discharge is effective in the case where the undershower $a_6$ in which shower water is discharged upwardly, as described later. The operation will be described hereinafter.

When the switch $b_6$-3 of the operation switches $b_1$-1 to $b_1$-3 of the under shower $a_6$ at the operating panel $a_7$ is depressed, the discharged water from both the right and left discharge ports $a_6$-1 and $a_6$-2 is gradually increased as described above, and reaches the predetermined amount of discharge. Under this condition, the water stop switch 64 is depressed or "both" switch ($b_6$-3) is depressed again, thereby both electromagnetic valves 8b and 8b are closed causing the discharged water from both discharging ports $a_6$-1 and $a_6$-2 to be stopped.

When the water stop switch 64 is not depressed and one of the "left" and "right" switches $b_6$-1 and $b_6$-2 of the under shower $a_6$ is depressed, for example, "left" switch $b_6$-2 is depressed, the flow rate adjusting valve 13b is metered and when the amount reaches ½ of the predetermined flow rate, resulting in that the right electromagnetic valve 8b is closed and the discharged water from the right discharging port $a_6$-1 is stopped and subsequently the flow rate adjusting valve 13b is loosened, the instantaneous flow rate to be discharged from the left discharging port $a_6$-2 approaches the predetermined flow rate value. When the flow rate reaches the predetermined value, the operation of the flow rate adjusting valve 13b is stopped, and the flow rate subsequent to this operation is kept constant.

Under an initial condition, any one of the "left" and "right" switches $b_6$-1 and $b_6$-2 of the under shower $a_6$ is selected, for example, "right" switch $b_6$-1 is depressed, thereby the flow rate adjusting valve 13b is metered and at the same time the electromagnetic valves 8b and 8b are opened and then the instantaneous flow rate from the right and left discharging ports $a_6$-1 and $a_6$-2 is less in volume or such as not to strike the body too strongly, the water discharging is started and after a predetermined time elapses, only the left electromagnetic valve 8b is closed. Subsequently, the flow rate adjusting valve 13b is loosed and an instantaneous flow rate discharged from the right discharging port $a_6$-1 approaches the predetermined flow rate. When the value reaches the set flow rate, the operation of the flow rate adjusting valve 13b is stopped.

Under this condition, the water stopping switch 64 is depressed or the "right" switch $a_6$-1 is depressed again, thereby the right electromagnetic valve 8b is closed, causing the discharged water from the right discharging port $a_1$-1 to be stopped.

When the "Left" switch $b_6$-2 for the under shower is depressed without depressing the water stopping switch 64, the right electromagnetic valve 8b is caused to be closed. The discharged water from the right discharging port $a_6$-1 is stopped. At the same time, the left electromagnetic valve 8b is opened and the water discharging from the left water discharging port $a_6$-2 is started.

In addition, the "both" switch $b_1$-3 of the under shower 9b is depressed from this state causing both electromagnetic valves 8b and 8b to open and simultaneously with this operation, and the flow rate adjusting valve 13b is metered. Then, the water discharging operation is started in such a degree that the hot water or cold water from the right and left water discharging ports $a_6$-1 and $a_6$-2 may not strike severely against the user's body, and subsequently the flow rate adjusting valve 13e is loosed and the instantaneous flow rate of the water discharged from both discharging ports $a_6$-1 and $a_6$-2 approaches the predetermined flow rate. When it reaches the predetermined flow rate, the operation of the flow rate adjusting valve 13b is stopped.

When any one of the switches $b_6$-1 to $b_6$-3 for the undershower on the operating panel $a_6$ is depressed, the electromagnetic valves 8b and 8b or one valve 8b corresponding thereto is opened. At the same time, the start timing detection means 79 first detects an automatic control start signal to output a detection signal to the start flow rate adjusting device 80. With this, the start flow rate adjusting device 80 throttles an opening degree of the flow rate adjusting valve 13b, whereby hot water or cold water supplied from the hot water and cold water mixing cock 3 is supplied to discharge ports $a_6$-1 to $a_6$-2 of the undershower. The discharge is started to an extent that hot water or cold water is not exposed violently to the body of the user from discharge ports $a_6$-1 to $a_6$-2.

The start flow rate adjusting device 80 loosens an opening degree of the flow rate adjusting valve 13b simultaneously, or after a predetermined time to thereby increase an instantaneous flow rate of hot water or cold water to be discharged to assume a programmed instantaneous flow rate so that the hot water or cold water is dischaged obliquely and upwardly towards the lower half of the body of the user who stands up in front of the shower tower body A' from the discharge ports $a_6$-1, $a_6$-2.

The upward discharge is exposed to the front of the waist of the user when the user stands up frontwardly opposite to the shower tower body A', exposed to the back of the waist and the hips when the user stands up backwardly, and exposed to a thigh and the calf when the user moves toward the shower tower body A'.

Figure 12:
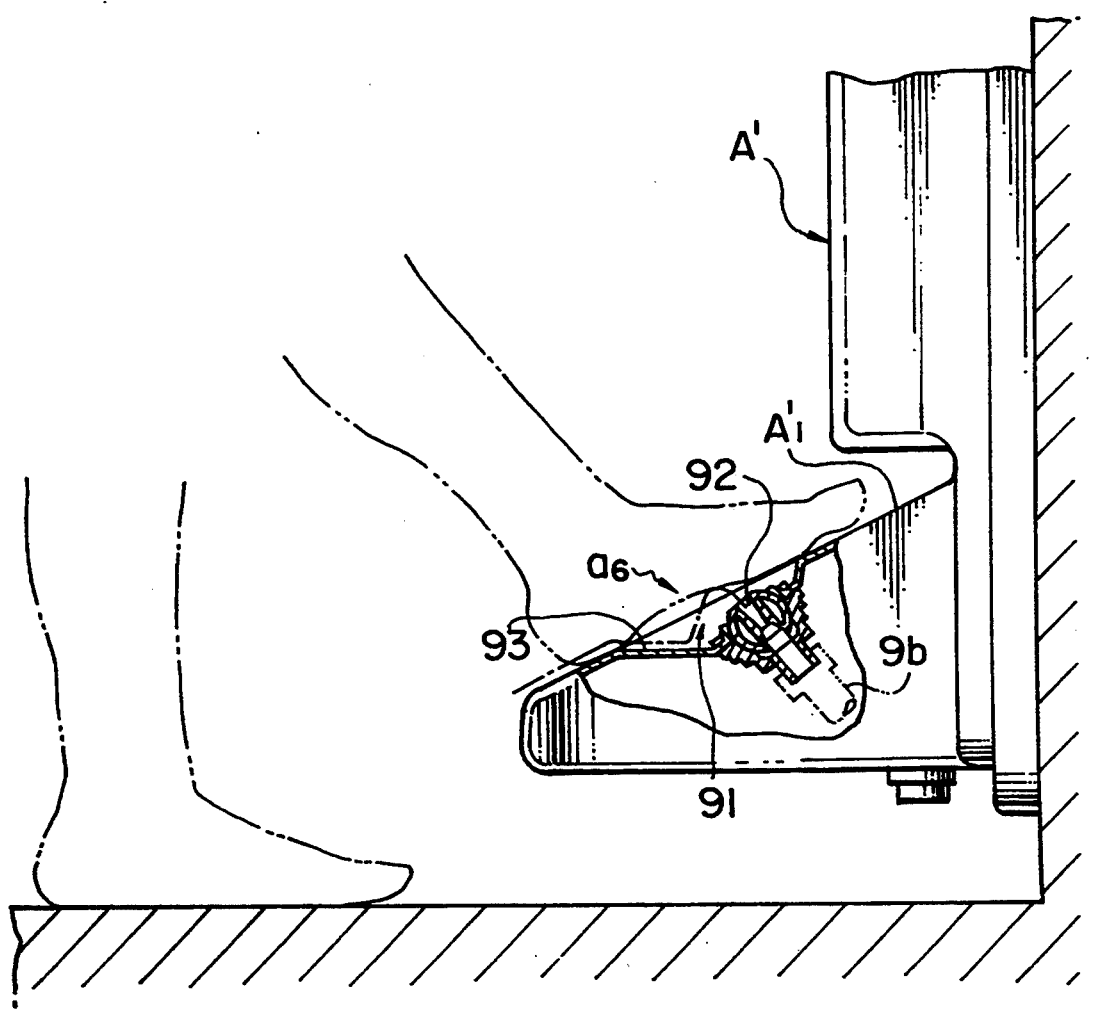
FIG. 12 is a partly cutaway side view showing an udner shower portion in an enlarged scale.
Figure 13:
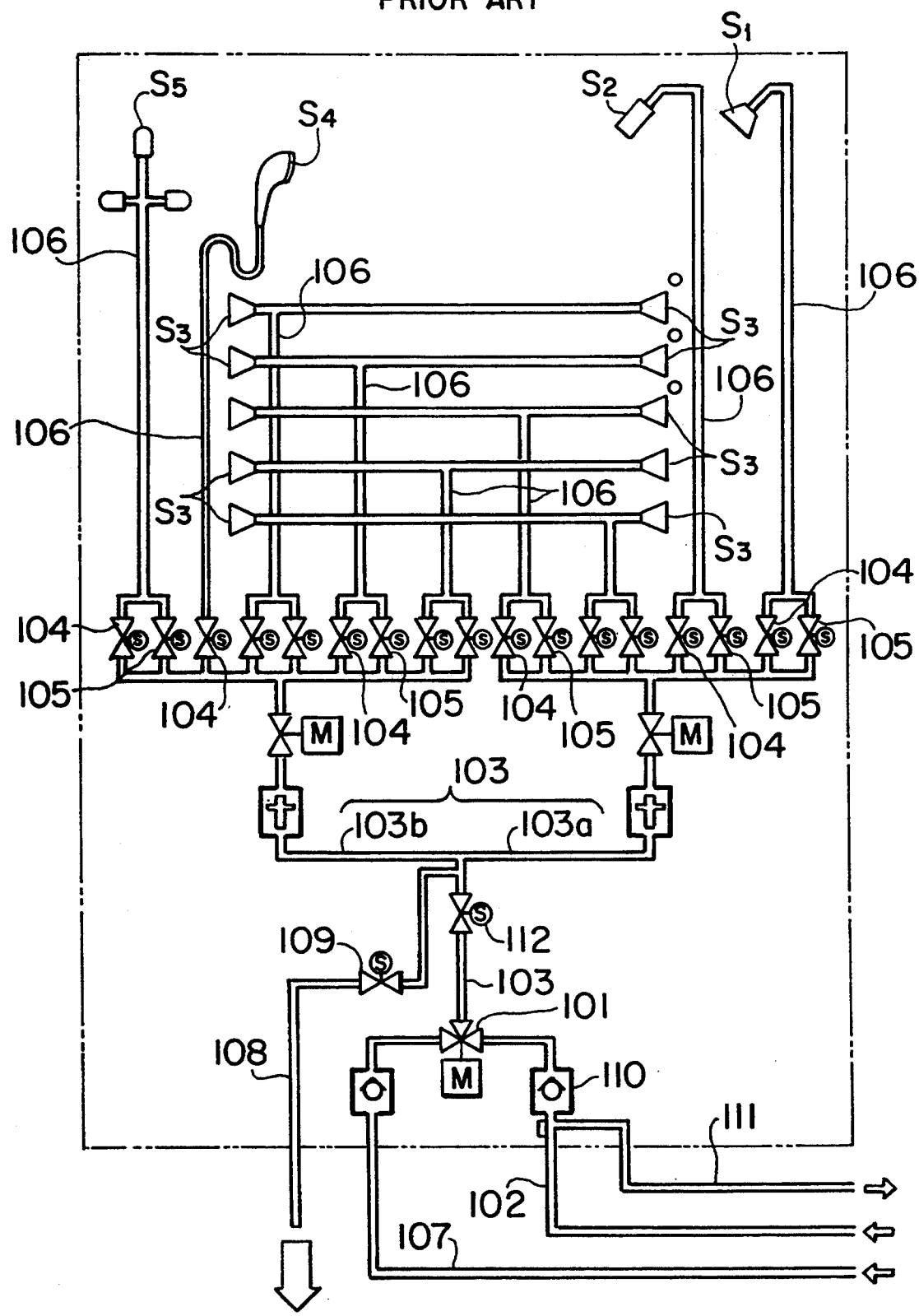
FIG. 13 is a schematic view showing a conventional shower apparatus.

As shown in FIG. 12 when the user stands up and extends his or her foot to be placed on the recess 91 to which hot water or cold water is discharged on the upper surface of the extended portion A'₁, the hot water or cold water is exposed to the sole. When the user sits on the chair and places both feet on recesses 91 in the state where hot water or cold water is discharged from both discharge ports $a_6$-1 $a_6$-2, the hot water or cold water is exposed to the soles of both feet.

Furthermore, when the stop switch 64 on the operating panel $a_7$ is depressed or any one of the switches $b_6$-1 and $b_6$-3 for the undershower is again depressed, the valve 8b presently opened is immediately closed to stop discharge from the discharge ports $a_6$-1, $a_6$-2.

In the case where the control as described above is applied to the undershower $a_6$, stimulation can be given to portions of the lower half of the body and soles to which enough stimulation cannot be given by the body shower $a_4$, the overhead shower $a_1$ or the hand shower $a_5$ and these body parts can be massaged. Also, at the start of discharge, the user is relieved from a surprise, and less-familiar undershower $a_6$ can be used in comfort.

In the case where other showers are provided together with the undershower $a_6$, and the start and stop of discharge from these showers are controlled by the operating panel $a_7$, a small amount of discharge at the start of discharge of the undershower $a_6$ can be used a a function of a notice. If the undershower $a_6$ is erroneously discharged, instead of using other showers, it can be stopped promptly by the aforesaid function of a notice.

Next, the characteristic exposing hot water $a_3$ in the shower discharge ports $a_1$-1 to $a_6$-2 and the construction of the undershower $a_6$ in the shower apparatus A according to the present embodiment will be described hereinafter.

As shown in FIG. 2, where a pair of left, and right discharge ports $a_3$-1 and $a_3$-2 for exposing hot water $a_3$ are obliquely upwardly protruded on both sides 12 at the upper part of the longitudinally extending shower tower body A'. Such ports are designed so that hot water or cold water from the discharge ports $a_3$-1 and $a_3$-2, are discharged in a parabola-like fashion. The hot water or cold water is intermittently exposed to two parts such as both shoulders of the user who sits on the chair in front of the shower tower body A'. A pair of left and right discharge ports $a_6$-1 and $a_6$-2 of the undershower $a_6$ are obliquely upwardly disposed on the upper surface of the extended portion A'₁ which protrudes to the lower end of the shower tower body A' so that hot water or cold water is discharged from the discharge ports $a_6$-1 an $a_6$-2 of the undershower toward the lower half of the body of the user who stands up in front of the shower tower body A'.

As shown in FIG. 12, the upper surface of the extended portion A'₁ is inclined upward from the extreme end toward the shower tower body A'. A pair of recesses 91 which are smaller than long-side dimension of the sole and smaller than short-side dimension thereof, are formed in the central portion. Discharge ports $a_6$-1 and $a_6$-2 of the undershower are bored in the bottom surface of the recesses 91, whereby even if the sole of a foot is placed so as to cover the recess 91, the discharge port $a_6$-1, $a_6$-2 of the undershower are not blocked. Each recess 91 is formed with a drain passage 93 with its lower inner peripheral surface partly inclined substantially horizontally or downwardly so as to discharge hot water or cold water from the inside of the recess 91 to the outside.

The drain passage 93 is not limited to that as described above but for example, a through-hole extending through the inside and outside of the recess 91 may be employed. The inside diameter of each discharge port $a_6$-1, $a_6$-2 of the undershower can be partly drawn from the inside diameter of the hot water line 9b to increase the flow velocity of hot water or cold water supplied from the hot water and cold water mixing cock 3 for discharge.

Next, the operation will be described.

First, the discharge switches $b_3$-1 and $b_3$-2 for exposing hot water $a_3$ on the operating panel $a_7$ are depressed, to alternately open the electromagnetic valves 8a and 8a for a period of time, or only one valve 8a is opened, or both the valves 8a and 8b are simultaneously opened. Then, hot water or cold water in a set instantaneous flow rate and at a set temperature is supplied from the hot water and cold water mixing cock 3 to each of the discharge ports $a_3$-1 and $a_3$-2 for exposing hot water $a_3$.

The hot water or cold water are obliquely upwardly discharged from each of the discharge ports $a_3$-1 and $a_3$-2 for exposing hot water $a_3$. The discharge hot water or cold water depicts a parabola, in which case at the apex thereof, the upward velocity component is lost and a state close to a free drop is provided. A stream line is divided into water droplets, which are accelerated by gravity. As a result, at drop points where hot water or the like contacts the shoulders of the user or the like, an intermittent discharge state is obtained. Thus, the hot water or the like alternately contacts to two parts such as both shoulders or concentratedly contacts to one part such as one shoulder or simultaneously contacts to two parts such as both shoulders.

Operation of the undershower a₆ is performed as described above.

According to the above-described embodiment, hot water or cold water intermittently falls from the exposing hot water a₃, at the upper part of the shower tower body A', to intermittently expose it to the body, or hot water or cold water is blown upwardly from the lower under shower a₆ to expose it to the lower half of the body and the sole of foot. Therefore, exposing hot water, which is excellent in stimulation and massage feeling can be discharged from the top of the shower tower body A' or suitable stimulation can be given from the bottom of the shower body A' to the waist, the hips, the thigh, the calf, the sole and the like.

Moreover, the electromagnetic valves 8a, 8a are alternately controlled to intermittently discharge hot water or cold water for a preset period of time from each of the discharge ports a₃-1 and a₃-2 of the exposing hot water a₃ or only one electromagnetic valve is controlled to concentratedly intermittently discharge hot water or cold water from a single discharge port or both electromagnetic valves 8a and 8a are simultaneously controlled to simultaneously intermittently discharge the exposing hot water a₃ or the like from a plurality of discharge ports whereby exposing hot water, which is excellent in stimulation and massage feeling, can be discharged according to the purpose of the user.

As compared with the conventional apparatus in which hot water or cold water is fallen in a rod-like fashion to expose hot water or cold water to the body, the massage effect is enhanced. In addition, as compared with the prior art, which has a single discharge port, the apparatus of the invention can be freely used according to the purpose of the user to render the easy use of the apparatus.

We claim:

1. A shower apparatus comprising:
    a shower tower body mountable to a shower wall, wherein said shower tower body is adapted to conceal plumbing which extends from the shower wall for supplying water to said shower apparatus;
    said shower tower body further comprising a vertically extending main panel having upper and lower ends;
    an overhead shower port housing extending substantially horizontally outward from said upper end of said main panel;
    a lower shower port housing comprising a lower surface extending substantially horizontally outward from said lower end of said main panel, and an upper surface which declines from an end nearer said main body to an end further from said main body, wherein upon mounting said shower tower body to a shower wall, said lower shower port housing extends at substantially a floor level of a shower to provide a support for a user's foot;
    at least one shower port supported in said lower shower port housing and directed upwardly; and
    at least one shower port supported in said overhead shower port and directed substantially vertically downward.

2. The shower apparatus of claim 1, wherein said shower tower body further comprises:
    an operating panel mounted substantially in the center of said main panel for electronically controlling water temperature and discharge parameters of said shower ports.

3. The shower apparatus of claim 1, wherein said shower tower body further comprises:
    at least one shower port mounted on said main panel near said upper end, and directed upwardly for discharging water in an arc pattern to fall upon the shoulders of the user.

4. The shower apparatus of claim 3, wherein said at least one shower port mounted on said main panel near said upper end comprises two shower ports, wherein one of said two shower ports is mounted on each side of said main panel near said upper end.

5. The shower apparatus of claim 1, wherein said shower tower body further comprises:
    at least one shower port, mounted on said main panel at a level substantially midway between said upper and lower ends, and directed substantially horizontally so as to discharge directly at a user's body.

6. The shower apparatus of claim 5, wherein said at least one shower port mounted on said main panel at a level substantially midway between said upper and lower ends comprises two shower ports, wherein one of said two shower ports is mounted on each side of said main panel substantially midway between said upper and lower ends.

7. The shower apparatus of claim 1, wherein said at least one shower port supported in said overhead shower port housing and directed substantially vertically downward comprises:
    a spray discharge port for continuous discharge of water;
    a massage discharge port for discharging intermittent pulses of water streams; and
    a foam discharge port.

8. The shower apparatus of claim 1, wherein said at least one shower port supported in said overhead shower port housing and directed substantially vertically downward comprises:
    a centrally located shower port; and
    a pair of microshower discharge ports, wherein each of said pair is located on opposite sides of said centrally located shower port.

9. The shower apparatus of claim 1, said upper surface of said lower shower port housing further comprising:
    a recess for receiving said at least one shower port supported in said lower shower port housing, such that said shower port is recessed with respect to a planar portion of said upper surface;
    wherein placement of the sole of the foot of a user on said upper surface does not block discharge from said at least one shower port supported in said lower shower port housing.

10. The shower apparatus of claim 9, wherein said recess further comprises a drain for preventing buildup of water in said recess.

* * * * *